US011873390B2

(12) United States Patent
An et al.

(10) Patent No.: US 11,873,390 B2
(45) Date of Patent: Jan. 16, 2024

(54) CELLULOSE ESTER AND POLYMERIC ALIPHATIC POLYESTER COMPOSITIONS AND ARTICLES

(71) Applicant: Eastman Chemical Company, Kingsport, TN (US)

(72) Inventors: Haining An, Kingsport, TN (US); Wenlai Feng, Johnson City, TN (US); Michael Eugene Donelson, Kingsport, TN (US); Thomas Joseph Pecorini, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 829 days.

(21) Appl. No.: 16/968,718

(22) PCT Filed: Feb. 13, 2019

(86) PCT No.: PCT/US2019/017778
§ 371 (c)(1),
(2) Date: Aug. 10, 2020

(87) PCT Pub. No.: WO2019/160906
PCT Pub. Date: Aug. 22, 2019

(65) Prior Publication Data
US 2020/0399446 A1 Dec. 24, 2020

Related U.S. Application Data

(60) Provisional application No. 62/754,113, filed on Nov. 1, 2018, provisional application No. 62/741,096, filed
(Continued)

(51) Int. Cl.
*C08L 1/14* (2006.01)
*C08L 67/02* (2006.01)
(Continued)

(52) U.S. Cl.
CPC . *C08L 1/14* (2013.01); *C08J 5/18* (2013.01); *C08K 5/005* (2013.01); *C08L 67/02* (2013.01);
(Continued)

(58) Field of Classification Search
CPC combination set(s) only.
See application file for complete search history.

(56) References Cited

U.S. PATENT DOCUMENTS 1,683,347 A 9/1928 Gray et al.
1,698,049 A 1/1929 Clarke et al.
(Continued)

FOREIGN PATENT DOCUMENTS

EP    0 736 557 A1    10/1996
WO    WO 92/09654 A2    6/1992
WO    WO 01/85824 A2    11/2001

OTHER PUBLICATIONS

Notification of Transmittal of the International Search Report and the Written Opinion of the International Searching Authority dated Jun. 24, 2019 for International Application No. PCT/US2019/017778.

(Continued)

*Primary Examiner* — Peter A Salamon
(74) *Attorney, Agent, or Firm* — Robert C. Morriss

(57) ABSTRACT

A cellulose ester composition is provided comprising at least one cellulose ester, at least one polymeric aliphatic polyester, at least one impact modifier, and at least one monomeric plasticizer. Processes for producing the cellulose ester compositions as well as articles made using these compositions, such as eyeglass or sunglass frames and/or lenses, are also provided.

20 Claims, 1 Drawing Sheet

Related U.S. Application Data on Oct. 4, 2018, provisional application No. 62/630,292, filed on Feb. 14, 2018, provisional application No. 62/629,999, filed on Feb. 13, 2018.

(51) Int. Cl.

| | |
|---|---|
| *C08K 5/00* | (2006.01) |
| *C08L 67/04* | (2006.01) |
| *G02B 1/04* | (2006.01) |
| *C08J 5/18* | (2006.01) |

(52) U.S. Cl.
CPC .............. *C08L 67/04* (2013.01); *G02B 1/041* (2013.01); *C08J 2301/14* (2013.01); *C08J 2467/02* (2013.01); *C08L 2205/02* (2013.01); *C08L 2666/68* (2013.01)

(56) References Cited

U.S. PATENT DOCUMENTS

| | | |
|---|---|---|
| 1,880,560 A | 10/1932 | Webber et al. |
| 1,880,808 A | 10/1932 | Clarke et al. |
| 1,984,147 A | 12/1934 | Malm |
| 2,129,052 A | 9/1938 | Fordyce |
| 3,448,173 A | 6/1969 | Ryan et al. |
| 3,617,201 A | 11/1971 | Berni |
| 3,655,825 A | 4/1972 | Souder |
| 3,853,968 A | 12/1974 | Bortnick et al. |
| 4,147,603 A | 4/1979 | Pacifici et al. |
| 4,446,585 A | 5/1984 | Harding et al. |
| 4,758,645 A | 7/1988 | Miyazono et al. |
| 4,839,230 A | 6/1989 | Cook |
| 4,861,629 A | 8/1989 | Nahm |
| 5,082,914 A | 1/1992 | Cook et al. |
| 5,182,379 A | 1/1993 | Cook et al. |
| 5,292,877 A | 3/1994 | Edgar et al. |
| 5,384,163 A | 1/1995 | Budde et al. |
| 5,534,594 A | 7/1996 | Troy et al. |
| 5,723,151 A | 3/1998 | Cook et al. |
| 5,741,901 A | 4/1998 | Cook et al. |
| 5,750,677 A | 5/1998 | Edgar et al. |
| 5,871,573 A | 2/1999 | Cook et al. |
| 5,900,322 A * | 5/1999 | Buchanan ............... C08L 67/00 528/308 |
| 5,981,738 A | 11/1999 | Cook et al. |
| 6,331,580 B1 | 12/2001 | Molnar |
| 6,369,214 B1 | 4/2002 | Tye et al. |
| 2002/0132960 A1* | 9/2002 | Haile ................... A61L 15/225 528/272 |
| 2017/0166740 A1* | 6/2017 | Weinlein ................. C08L 71/02 |

OTHER PUBLICATIONS

Notification of Transmittal of the International Search Report and the Written Opinion of the International Searching Authority dated Jun. 24, 2019 for International Application No. PCT/US2019/017783.

ASTMD3418; Standard Test Method for Transition Temperatures and Enthalpies of Fusion and Crystallization of Polymers by Differential Scanning Calorimetry; Published Jun. 2015.

ASTMD1003; "Standard Test Method for Haze and Luminous Transmittance of Transparent Plastics"; Published Nov. 2013.

ASTMD4440; "Standard Test Method for Plastics: Dynamic Mechanical Properties Melt Rheology"; Published Feb. 2015.

ASTMD256; "Standard Test Methods for Determining the Izod Pendulum Impact Resistance of Plastics"; Published Nov. 2018.

ASTMD3763; "Standard Test Method for High Speed Puncture Properties of Plastics Using Load and Displacement Sensors"; Published Nov. 2018.

ASTMD1238; "Standard Test Method for Melt Flow Rates of Thermoplastics by Extrusion Plastometer"; Published Aug. 2020.

ASTMD790; "Standard Test Methods for Flexural Properties of Unreinforced and Reinforced Plastics and Electrical Insulating Materials"; Published Jul. 2017.

Encyclopedia Chemical Technology 5th edition, vol. 5 (2004) pp. 394-444.

Tachibana, Yuya et al.; "Cellulose acetate butyrate as multifunctional additive for poly(butylene succinate) by melt blending: Mechanical properties, biomass carbon ratio, and control of biodegradability"; Polymer Degradation and Stability, 95 (2010), pp. 1406-1413.

Zhou, Weihua et al.; "Morphology and Hydrogen-Bond Restricted Crystallization of Poly(butylene succinate)/Cellulose Diacetate Blends"; Journal of Applied Polymer Science, vol. 124, (2012), pp. 3124-3131.

Tatsushima, Tohru et al.; "Structure and Physical Properties of Cellulose Acetate Butyrate/Poly(butylene succinate) Blend"; Journal of Applied Polymer Science, vol. 96 (2005) pp. 400-406.

Lee, Seung-Hwan et al.; "Crystallization behaviour of cellulose acetate butylate/poly(butylene succinate)-co-(butylene carbonate) blends"; Polymer International 55, (2006), pp. 292-298.

Uesaka, Takahiro et al.; "Structure and Physical Properties of Cellulose Acetate/Poly(butylene succinate) Blends Containing a Transition Metal Alkoxide"; Journal of Applied Polymer Science, vol. 83, (2002), pp. 1750-1758.

Co-pending U.S. Appl. No. 16/968,635, filed Aug. 10, 2020; An et al.

* cited by examiner

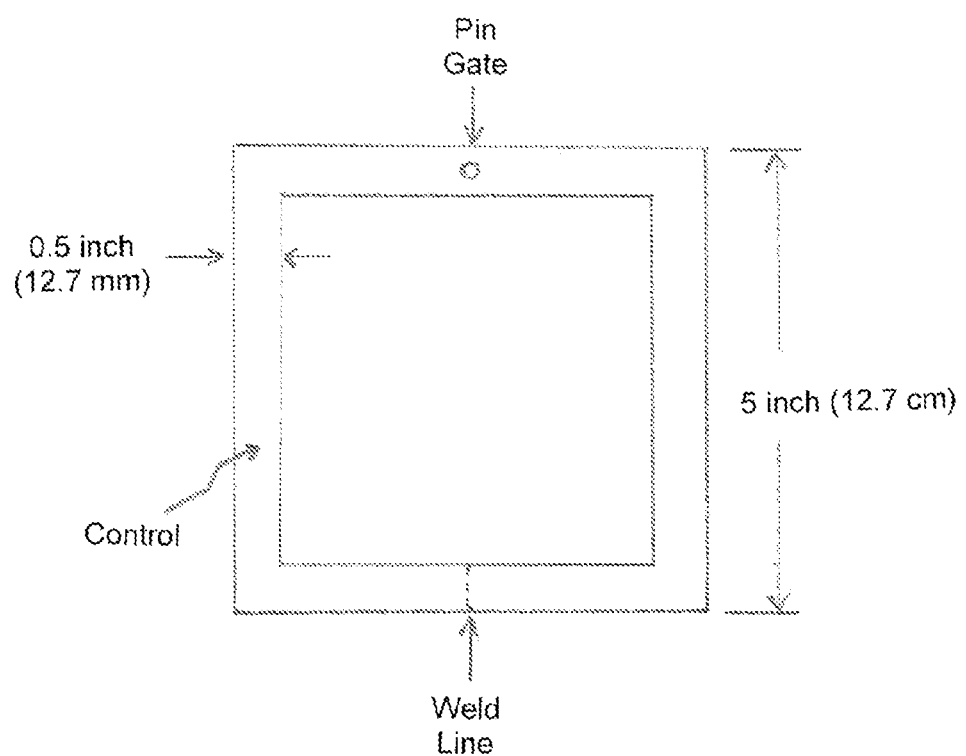

CELLULOSE ESTER AND POLYMERIC ALIPHATIC POLYESTER COMPOSITIONS AND ARTICLES

CROSS-REFERENCE TO RELATED APPLICATION(S)

This application is a national stage filing under 35 USC § 371 of International Application Number PCT/US2019/017778, filed on, Feb. 13, 2019 which claims the benefit of the filing date to U.S. Provisional Application Nos. 62/629,999, 62/630,292, 62/741,096, and 62/754,113 filed on Feb. 13, 2018, Feb. 14, 2018, Oct. 4, 2018, Nov. 1, 2018 the entire disclosures of which are incorporated by reference herein.

FIELD OF THE INVENTION

This invention belongs to the field of cellulose ester chemistry, particularly to cellulose esters comprising polymeric aliphatic polyesters (PAP), impact modifiers and monomeric plasticizers. Processes for producing these cellulose ester compositions as well as plastic articles made using these compositions, such as eyeglass frames, automotive parts, and toys are also provided.

BACKGROUND OF THE INVENTION

Cellulose ester compositions typically have a heat deflection temperature (HDT) or glass transition temperature (Tg) of less than 90° C. Commercially available cellulose esters that are melt processed into articles typically contain significant amounts of monomeric plasticizer to allow for processing and to impart sufficient toughness to the molded article. However, the addition of high levels of monomeric plasticizer has drawbacks, as they will decrease the HDT relative to the base cellulose ester and limit the use of the cellulose ester materials for applications that can accommodate an HDT below about 90° C. Also, common monomeric plasticizers used in cellulose ester molded articles can experience plasticizer exudation during processing and use.

It would be beneficial to be able to provide melt processable cellulose ester compositions that do not have such drawbacks.

BRIEF SUMMARY OF THE INVENTION

Surprisingly, it has been discovered that compositions of cellulose esters, including cellulose acetate propionate (CAP), can be prepared with glass transition temperatures (Tg's) of about 110° C., or 120° C., or higher, and have good clarity and toughness. In embodiments of this invention, this can be achieved by reducing the amount of monomeric plasticizer in the compositions. Reducing the monomeric plasticizer can limit or eliminate the common problems associated with monomeric plasticizer exudation during use. However, reducing the monomeric plasticizer can decrease the toughness of these high Tg cellulosic compositions. Surprisingly, it has been found that certain combinations of CAP and polybutylene succinate family of polymers, which can include other polymeric aliphatic polyesters (for example polyethylene, polypropylene or polybutylene succinate, glutarate or adipate) and can include different comonomers or termonomers (collectively described as PBS Polymer or PAP, as defined below) can restore the toughness of high Tg cellulosic compositions, and provide a cellulose ester composition with good flow properties and good clarity that is suitable for higher temperature applications and that maintains long term dimensional stability.

In certain embodiments, this invention relates to the dispersion of one or more PAPs, e.g., poly(butylene succinate) ("PBS"), into cellulose ester compositions, in amounts sufficient to improve the mechanical and physical properties of the cellulose ester compositions. The PAP (e.g., PBS) modified cellulose esters, according to embodiments of the invention, have the unique properties of being melt processable, having significantly higher Tg's relative to commercially available plasticized cellulose ester thermoplastics, have high modulus, good impact properties, and good resistance to deformation under load. In embodiments, the PBS Polymer (or PAP) modified cellulose esters can have good gate strength and/or acoustic damping properties.

In one embodiment of the invention, a cellulose ester composition is provided comprising at least one cellulose ester and at least one PAP (e.g., PBS). In one embodiment, the cellulose ester is chosen from cellulose acetate propionate containing from about 10 to about 40% by weight propionyl, based on the total weight of the polymer, and the cellulose ester composition has a Tg of at least 120° C. In certain embodiments, the cellulose ester composition has a Tg of at least 140° C. or at least 150° C.

In another embodiment of the invention, a cellulose ester composition is provided which comprises at least one cellulose ester, and at least one PAP, and at least one impact modifier. In another embodiment of the invention, a cellulose ester composition is provided which comprises at least one cellulose ester, and at least one PAP, at least one impact modifier, and 1 to less than 5 wt % monomeric plasticizer.

In another embodiment of the invention, a process for producing the cellulose ester composition is provided comprising contacting at least one cellulose ester, at least one PAP, at least one impact modifier and at least one monomeric plasticizer, and mixing the combination. In one embodiment, the cellulose ester composition includes a monomeric plasticizer that is present in an amount that does not substantially reduce the Tg of the cellulose ester composition compared to a similar composition without the monomeric plasticizer. In embodiments, the Tg does not change (e.g., reduce) more than 10%, or 5%, or 2%, as a result of including the monomeric plasticizer.

In embodiments of the invention, cellulose ester compositions are described that contain less than 5 wt % monomeric plasticizer, but contain 1 wt %-35 wt %, or 2.5 wt %-30 wt %, or 5 to 20 wt %, or 6 to 18 wt %, or 7 to 15 wt %, PAP, based on the total weight of the cellulose ester composition, and have Tg values greater than 120° C., or at least 140° C., or at least 150° C., and have notched Izod impact strength values greater than 80, or 100, or 110, or 125, or 150, or 175, or 200 J/m at 23° C.

In another embodiment of the invention, cellulose ester compositions are provided that contain less than 5 wt % monomeric plasticizer, but are melt processable. In embodiments, the melt processable cellulose ester compositions contain 1 wt %-35 wt %, or 2.5 wt %-30 wt %, or 5 to 20 wt %, or 6 to 18 wt %, or 7 to 15 wt %, PAP, based on the total weight of the cellulose ester composition, and have Tg values greater than 120° C., or at least 140° C., or at least 150° C., notched Izod impact strength values greater than 80, or 100, or 110, or 125, or 150, or 175, or 200 J/m at 23° C., and spiral flow values of at least 38 centimeters (15 inches) when measured using the procedure described herein at a barrel temperate of 240° C.

In embodiments, the monomeric plasticizer is present in an amount that does not substantially reduce the Tg of the cellulose ester composition compared to a similar composition without the monomeric plasticizer. In embodiments, the Tg does not change (e.g., reduce) more than 10%, or 5%, or 2%, as a result of including the monomeric plasticizer.

In one embodiment of the invention, a polymer-based resin is provided comprising at least one cellulose ester, at least one PAP, and at least one monomeric plasticizer, where the cellulose ester is CAP and the PAP is PBS, and where the resin contains 0-5 wt %, 0 to less than 5 wt %, 0-4 wt %, 0-2 wt %, or 0-1 wt % monomeric plasticizer. In one embodiment, the cellulose ester is CAP and the resin contains less than 5 wt % monomeric plasticizer. In one embodiment, the cellulose ester is CAP, the PBS has an MFR (190° C., 2.16 kg) less than 10 and Elongation at Break of 200% or greater, and the resin contains less than 5 wt % monomeric plasticizer and less than 10 wt %, or less than 8 wt % of any other additives. However, in some embodiments, the resin may also include additional pigments or colorants or optical additives for opaque/colored applications, e.g., titanium dioxide.

In certain embodiments, the MFR of the PAP measured at 190° C. with a 2.16 kg load as per ASTM Test Method D1238 is less than 30.

In certain embodiments, the cellulose ester resin is chosen from at least one cellulose propionate (CP), cellulose butyrate (CB), cellulose acetate propionate (CAP), cellulose acetate butyrate (CAB), cellulose acetate iso-butyrate (CAIB), cellulose propionate butyrate (CPB), cellulose tri-propionate (CTP), or cellulose tributyrate (CTB). In certain embodiments, the resin contains less than 25, or less than 20, or less than 15, or less than 10, or less than 5 wt %, or none, of any other polymer(s) that contribute to the continuous binder phase of the resin with the cellulose ester. For example, in certain embodiments, the PAP (e.g., PBS) is present as a dispersed phase within the cellulose ester resin and does not contribute to the continuous binder phase of the resin with the cellulose ester.

In certain embodiments, the cellulose ester resin is chosen from at least one cellulose propionate (CP), cellulose butyrate (CB), cellulose acetate propionate (CAP), cellulose acetate butyrate (CAB), cellulose acetate iso-butyrate (CAIB), cellulose propionate butyrate (CPB), cellulose tri-propionate (CTP), or cellulose tributyrate (CTB), and the PAP (e.g., PBS) is miscible in the cellulose ester resin, or in the same phase as the cellulose ester binder phase. In certain embodiments, the cellulose ester resin and PAP (e.g., PBS) are miscible, and the cellulose ester composition further comprises an impact modifier. In one embodiment, the impact modifier is a core-shell impact modifier. In one embodiment, the impact modifier is an acrylic core shell impact modifier.

In certain embodiments, a cellulose ester composition is provided which comprises at least one cellulose ester, at least one PAP, at least one impact modifier, and 1 to less than 5 wt % monomeric plasticizer. In embodiments, the PAP, impact modifier and monomeric plasticizer are present in amount sufficient to provide a composition capable of molding and having a balance of relatively high Tg, good toughness, resistance to creep (i.e., deformation under load), and good gate strength. In embodiments, the cellulose ester is CAP, the PAP is PBS, the impact modifier is an acrylic core shell impact modifier, and the monomeric plasticizer is an adipate based monomeric plasticizer (e.g., DOA), and the composition comprises 2 to 10 wt %, or 3 to 8 wt % PBS; 2 to 10 wt %, or 4 to 8 wt % impact modifier; and 2 to less than 5 wt % monomeric plasticizer. In one embodiment, the monomeric plasticizer is DOA.

In certain embodiments, for any of the embodiments described above, the one or more PAP comprises PBS or a copolymer of poly(butylene succinate) and poly(butylene adipate) (PBSA). In certain embodiments, for any of the embodiments described above, the PAP is PBS or PBSA. In certain embodiments, for any of the embodiments described above, the PAP is PBS.

In certain embodiments, the cellulose ester can be chosen from cellulose acetate butyrate containing from about 5 to about 55% by weight butyryl, based on the total weight of the polymer. In certain embodiments, the cellulose ester can be chosen from cellulose acetate propionate containing from about 5 to about 50% by weight propionyl, based on the total weight of the polymer.

In certain embodiments, the cellulose ester is cellulose acetate propionate (CAP) having a propionyl content higher than 5 wt %, based on the total weight of the polymer. In certain embodiments, the cellulose ester is cellulose acetate propionate (CAP) having a propionyl content higher than 40% based on the total weight of the CAP polymer. In certain embodiments, the cellulose ester is cellulose acetate propionate (CAP) having a propionyl content less than 40%, based on the total weight of the CAP polymer.

In certain embodiments, the cellulose ester is cellulose acetate butyrate (CAB) having a butyryl content higher than 5 wt %, based on the total weight of the polymer. In certain embodiments, the cellulose ester is cellulose acetate butyrate (CAB) having a butyryl content higher than 40% based on the total weight of the CAB polymer. In certain embodiments, the cellulose ester is cellulose acetate butyrate (CAB) having a butyryl content less than 32%, or butyryl content in the range between 15 and 32 wt %, based on the total weight of the CAB polymer.

BRIEF DESCRIPTION OF THE FIGURES

Embodiments of the present disclosure are described herein with reference to the following figures, wherein:

FIG. 1 is a schematic illustration of the picture frame mold used to mold square picture frame test articles for gate strength testing.

DETAILED DESCRIPTION

In one embodiment of the invention, a cellulose ester composition is provided comprising at least one cellulose ester, at least one PAP, at least one impact modifier and at least one monomeric plasticizer.

In embodiments, the cellulose ester utilized in this invention can be any cellulose ester having a sufficient content of salt or ester moieties of $C_3$ to $C_{10}$ acids, preferably propionate and/or butyrate moieties. Cellulose esters that can be used for the present invention generally comprise repeating units of the structure:

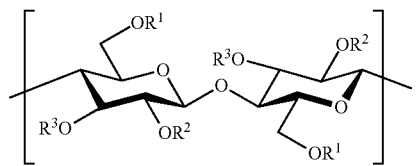

wherein $R^1$, $R^2$, and $R^3$ are selected independently from the group consisting of hydrogen or straight chain alkanoyl having from 2 to 10 carbon atoms. For cellulose esters, the substitution level is usually expressed in terms of degree of substitution (DS), which is the average number of non-OH substituents per anhydroglucose unit (AGU). Generally, conventional cellulose contains three hydroxyl groups in each AGU unit that can be substituted; therefore, DS can have a value between zero and three. However, low molecular weight cellulose mixed esters can have a total degree of substitution slightly above 3, as a result of end group contributions. Native cellulose is a large polysaccharide with a degree of polymerization from 250-5,000 even after pulping and purification, and thus the assumption that the maximum DS is 3.0 is approximately correct. However, as the degree of polymerization is lowered, as in low molecular weight cellulose mixed esters, the end groups of the polysaccharide backbone become relatively more significant, thereby resulting in a DS that can range in excess of 3.0. Low molecular weight cellulose mixed esters are discussed in more detail subsequently in this disclosure. Because DS is a statistical mean value, a value of 1 does not assure that every AGU has a single substituent. In some cases, there can be unsubstituted anhydroglucose units, some with two and some with three substituents, and typically the value will be a non-integer. Total DS is defined as the average number of all of substituents per anhydroglucose unit. The degree of substitution per AGU can also refer to a particular substituent, such as, for example, hydroxyl, acetyl, butyryl, or propionyl.

In embodiments, the cellulose ester utilized can be a cellulose triester or a secondary cellulose ester. Examples of cellulose triesters include, but are not limited to, cellulose tripropionate or cellulose tributyrate. Examples of secondary cellulose esters include cellulose acetate propionate and cellulose acetate butyrate.

In one embodiment of the invention, the cellulose ester can be chosen from cellulose propionate (CP), cellulose butyrate (CB), cellulose acetate propionate (CAP), cellulose acetate butyrate (CAB), cellulose propionate butyrate (CPB), cellulose acetate isobutyrate (CAIB), cellulose tripropionate (CTP), or cellulose tributyrate (CTB) and the like, or combinations thereof. Examples of some cellulose esters are described in U.S. Pat. Nos. 1,698,049; 1,683,347; 1,880,808; 1,880,560; 1,984,147, 2,129,052; and 3,617,201, incorporated herein by reference in their entirety to the extent that they do not contradict the statements herein. In one embodiment, the cellulose ester is CAP.

In one embodiment of the invention, the cellulose ester can be chosen from cellulose propionate (CP), cellulose butyrate (CB), cellulose acetate propionate (CAP), cellulose acetate butyrate (CAB), cellulose acetate iso-butyrate (CAIB), cellulose propionate butyrate (CPB), cellulose tripropionate (CTP), or cellulose tributyrate (CTB), but not from cellulose acetate (CA).

In certain embodiments of the invention, the cellulose ester has a total percentage of propionyl by weight in the range from 5 to 52%, or 10 to 52%, or 15 to 52%, or 20 to 52%, or 25 to 52%, or 30 to 52%, or 35 to 52%, or 40 to 52%, or 45 to 52%, or 49 to 52%, or 5 to 50%, or 10 to 50%, or 15 to 50%, or 20 to 50%, or 25 to 50%, or 30 to 50%, or 35 to 50%, or 40 to 50%, or 45 to 50%, or 5 to less than 50%, or 10 to less than 50%, or 15 to less than 50%, or 20 to less than 50%, or 25 to less than 50%, or 30 to less than 50%, or 35 to less than 50%, or 40 to less than 50%, or 45 to less than 50%, or 35 to less than 50%, or 40 to less than 50%, or 45 to less than 50%, or 5 to 38%, or 10 to 38%, or 15 to 38%, or 20 to 38%, or 25 to 38%, or 30 to 38%, or 35 to 38%, or 5 to 35%, or 5 to 35%, or 10 to 35%, or 15 to 35%, or 20 to 35%, or 25 to 35%, or 30 to 35%, or 5 to 30%, or 10 to 30%, or 15 to 30%, or 20 to 30%, or 25 to 30%, or 5 to 20%, or 10 to 20%, based on the total weight of the cellulose ester polymer.

In certain embodiments of the invention, the cellulose ester has a total percentage of butyryl by weight in the range from 5 to 57%, or 10 to 57%, or 15 to 57%, or 20 to 57%, or 25 to 57%, or 30 to 57%, or 35 to 57%, or 40 to 57%, or greater than 40 to 57%, or 41 to 57%, or 45 to 57%, or 50 to 57%, or 5 to 55%, or 10 to 55%, or 15 to 55%, or 20 to 55%, or 25 to 55%, or 30 to 55%, or 35 to 55%, or 40 to 55%, or greater than 40 to 55%, or 41 to 55%, or 45 to 55%, or 50 to 55%, or 5 to 50%, or 10 to 50%, or 15 to 50%, or 20 to 50%, or 25 to 50%, or 30 to 50%, or 35 to 50%, or 40 to 50%, or greater than 40 to 50%, or 41 to 50%, or 45 to 50%, or 5 to 45%, or 10 to 45%, or 15 to 45%, or 20 to 45%, or 25 to 45%, or 30 to 45%, or 35 to 45%, or 40 to 45%, or greater than 40 to 45%, or 41 to 45%, or 5 to 35%, or 10 to 35%, or 15 to 35%, or 20 to 35%, or 25 to 35%, or 30 to 35%, or 5 to less than 32%, or 10 to less than 32%, or 15 to less than 32%, or 20 to less than 32%, or 25 to less than 32%, or 5 to 30%, or 10 to 30%, or 15 to 30%, or 20 to 30%, or 25 to 30%, based on the total weight of the cellulose ester polymer.

In certain embodiments, the cellulose ester is cellulose propionate butyrate or cellulose acetate propionate butyrate, with the combined propionate and butyryl content as a percentage of total weight of the polymer in the range from 15% to 55%, or 15% to 50%, or 15% to 45%, or 15% to 40%, or 15% to 35%, or 15% to 30%, or 15% to 25%, or 15% to 20%, or 20% to 55%, or 20% to 50%, or 20% to 45%, or 20% to 40%, or 20% to 35%, or 20% to 30%, or 20% to 25%, or 25% to 55%, or 25% to 50%, or 25% to 45%, or 25% to 40%, or 25% to 35%, or 25% to 30%, or 30% to 55%, or 30% to 50%, or 30% to 45%, or 30% to 40%, or 30% to 35%, or 35% to 55%, or 35% to 50%, or 35% to 45%, or 35% to 40%, 40% to 55%, or 40% to 50%, or 40% to 45%, or 40% to 55%, or 40% to 55%, or 40% to 55%, or 40% to 45%, or 45% to 55%, or 45% to 50%, or 50% to 55%.

Cellulose esters can be produced by any method known in the art. Examples of processes for producing cellulose esters are taught in Kirk-Othmer, Encyclopedia of Chemical Technology, $5^{th}$ Edition, Vol. 5, Wiley-Interscience, New York (2004), pp. 394-444. Cellulose, the starting material for producing cellulose esters, can be obtained in different grades and sources such as from cotton linters, softwood pulp, hardwood pulp, corn fiber and other agricultural sources, and bacterial cellulose, among others.

One method of producing cellulose esters is esterification of the cellulose by mixing cellulose with the appropriate organic acids, acid anhydrides, and catalysts. Cellulose is then converted to a cellulose triester. Ester hydrolysis is then performed by adding a water-acid mixture to the cellulose triester, which can then be filtered to remove any gel particles or fibers. Water is then added to the mixture to precipitate the cellulose ester. The cellulose ester can then be washed with water to remove reaction by-products followed by dewatering and drying.

The cellulose triesters to be hydrolyzed can have three substituents selected independently from alkanoyls having from 2 to 10 carbon atoms. Examples of cellulose triesters include cellulose triacetate, cellulose tripropionate, and cellulose tributyrate or mixed triesters of cellulose such as cellulose acetate propionate, and cellulose acetate butyrate. These cellulose esters can be prepared by a number of methods known to those skilled in the art. For example, cellulose esters can be prepared by heterogeneous acylation of cellulose in a mixture of carboxylic acid and anhydride in the presence of a catalyst such as $H_2SO_4$. Cellulose triesters can also be prepared by the homogeneous acylation of cellulose dissolved in an appropriate solvent such as LiCl/DMAc or LiCl/NMP.

After esterification of the cellulose to the triester, part of the acyl substituents can be removed by hydrolysis or by alcoholysis to give a secondary cellulose ester. As noted previously, depending on the particular method employed, the distribution of the acyl substituents can be random or non-random. Secondary cellulose esters can also be prepared directly with no hydrolysis by using a limiting amount of acylating reagent. This process is particularly useful when the reaction is conducted in a solvent that will dissolve cellulose. All of these methods can be used to yield cellulose esters that are useful in this invention.

The most common commercial secondary cellulose esters are prepared by initial acid catalyzed heterogeneous acylation of cellulose to form the cellulose triester. After a homogeneous solution in the corresponding carboxylic acid of the cellulose triester is obtained, the cellulose triester is then subjected to hydrolysis until the desired degree of substitution is obtained. After isolation, a random secondary cellulose ester is obtained. That is, the relative degree of substitution (RDS) at each hydroxyl is roughly equal.

Some examples of cellulose esters useful in various embodiments of the present invention can be prepared using techniques known in the art and can be obtained from Eastman Chemical Company, Kingsport, TN, U.S.A., e.g., Eastman™ Cellulose Acetate Propionate CAP 482-20, Eastman™ Cellulose Acetate Propionate CAP 141-20, Eastman™ Cellulose Acetate Butyrate CAB 381-20, and Cellulose Acetate Butyrate CAB 171-15. Examples of some common cellulose esters, with ball drop viscosity values shown, are listed below in Table 1.

and isocyanotoethyl methacrylate which links through a urethane bond and gives methacrylate functionality.

In one embodiment of the invention, functionalized cellulose esters are produced by reacting the free hydroxyl groups of the cellulose esters with a bifunctional reactant producing a cellulose ester with at least one functional group selected from the group consisting of unsaturation (double bonds), carboxylic acids, acetoacetate, acetoacetate imide, mercapto, melamine, and long alkyl chains.

Bifunctional reactants to produce cellulose esters containing long alkyl chain functionality are described in U.S. Pat. No. 5,750,677; which is incorporated by reference to the extent it does not contradict the statements herein. In one embodiment, the cellulose esters containing long alkyl chain functionality is produced by reaction of cellulose in a carboxamide diluents or a urea-based diluent with an acylating reagent using a titanium-containing specifies. Cellulose esters containing long alkyl chain functionality can be selected from the group consisting of cellulose acetate hexanoate, cellulose acetate nonanoate, cellulose acetate laurate, cellulose palmitate, cellulose acetate stearate, cellulose nonanoate, cellulose hexanoate, cellulose hexanoate propionate, and cellulose nonanoate propionate.

In certain embodiments, the cellulose ester is cellulose acetate propionate (CAP) having a propionyl content higher than 5%, based on the total weight of the CAP polymer. In certain embodiments, the cellulose ester is cellulose acetate propionate (CAP) having a propionyl content less than about 40% based on the total weight of the CAP polymer.

In certain embodiments of the invention, the cellulose ester has a total percentage of propionyl by weight in the range from 5 to 52%, or 10 to 52%, or 15 to 52%, or 20 to 52%, or 25 to 52%, or 30 to 52%, or 35 to 52%, or 40 to 52%, or 45 to 52%, or 49 to 52%, or 5 to 50%, or 10 to 50%, or 15 to 50%, or 20 to 50%, or 25 to 50%, or 30 to 50%, or

TABLE 1

Common Cellulose Esters

| CE Grade | Commercial CE Material | Viscosity | Acetyl Wt % | propionyl Wt % | butyryl Wt % | OH wt % |
|---|---|---|---|---|---|---|
| 1 | CAP 482-20 | 20 | 1.3 | 48 | 0 | 2.0 |
| 2 | CP520-7(CTP) | 7 | 0 | 50 | 0 | 0.6 |
| 3 | CAB 381-20 | 20 | 13.5 | 0 | 37 | 1.7 |
| 4 | CAP 141-3 | 3 | 29.1 | 14.7 | 0 | 2.3 |
| 5 | CAP 141-8 | 8 | 29.1 | 14.7 | 0 | 2.3 |
| 6 | CAP 141-20 | 20 | 29.1 | 14.7 | 0 | 2.3 |
| 7 | VM230 | 20 | 0 | 38 | 0 | 7.8 |
| 8 | CAP 202-29 | 29 | 24.48 | 18.07 | 0 | 3.3 |
| 9 | CA 398-3 | 3 | 39.8 | 0 | 0 | 3.6 |
| 10 | CA 398-10 | 10 | 39.8 | 0 | 0 | 3.6 |
| 11 | CA 398-30 | 30 | 39.8 | 0 | 0 | 3.6 |
| 12 | LA150 | 20 | 38 | 0 | 0 | 4.5 |

*CE Materials Manufactured by Eastman Chemical Company

In embodiments, the cellulose esters utilized in this invention can also contain chemical functionality and are described herein as either derivatized, modified, or functionalized cellulose esters. Functionalized cellulose esters can be produced by reacting the free hydroxyl groups of cellulose esters with a bifunctional reactant that has one linking group for grafting to the cellulose ester and one functional group to provide a new chemical group to the cellulose ester. Examples of such bifunctional reactants include succinic anhydride which links through an ester bond and provides acid functionality; mercaptosilanes which links through alkoxysilane bonds and provides mercapto functionality;

35 to 50%, or 40 to 50%, or 45 to 50%, or 5 to less than 50%, or 10 to less than 50%, or 15 to less than 50%, or 20 to less than 50%, or 25 to less than 50%, or 30 to less than 50%, or 35 to less than 50%, or 40 to less than 50%, or 45 to less than 50%, or 35 to less than 50%, or 40 to less than 50%, or 45 to less than 50%, or 5 to 38%, or 10 to 38%, or 15 to 38%, or 20 to 38%, or 25 to 38%, or 30 to 38%, or 35 to 38%, or 5 to 35%, or 5 to 35%, or 10 to 35%, or 15 to 35%, or 20 to 35%, or 25 to 35%, or 30 to 35%, or 5 to 30%, or 10 to 30%, or 15 to 30%, or 20 to 30%, or 25 to 30%, or 5 to 20%, or 10 to 20%, based on the total weight of the cellulose ester polymer.

In certain embodiments, the cellulose ester is cellulose acetate butyrate (CAB) having a butyryl content higher than 5%, based on the total weight of the CAB polymer. In certain embodiments, the cellulose ester is cellulose acetate butyrate (CAB) having a butyryl content less than 55%, based on the total weight of the CAB polymer.

In certain embodiments of the invention, the cellulose ester has a total percentage of butyryl by weight in the range from 5 to 57%, or 10 to 57%, or 15 to 57%, or 20 to 57%, or 25 to 57%, or 30 to 57%, or 35 to 57%, or 40 to 57%, or greater than 40 to 57%, or 41 to 57%, or 45 to 57%, or 50 to 57%, or 5 to 55%, or 10 to 55%, or 15 to 55%, or 20 to 55%, or 25 to 55%, or 30 to 55%, or 35 to 55%, or 40 to 55%, or greater than 40 to 55%, or 41 to 55%, or 45 to 55%, or 50 to 55%, or 5 to 50%, or 10 to 50%, or 15 to 50%, or 20 to 50%, or 25 to 50%, or 30 to 50%, or 35 to 50%, or 40 to 50%, or greater than 40 to 50%, or 41 to 50%, or 45 to 50%, or 5 to 45%, or 10 to 45%, or 15 to 45%, or 20 to 45%, or 25 to 45%, or 30 to 45%, or 35 to 45%, or 40 to 45%, or greater than 40 to 45%, or 41 to 45%, or 5 to 35%, or 10 to 35%, or 15 to 35%, or 20 to 35%, or 25 to 35%, or 30 to 35%, or 5 to less than 32%, or 10 to less than 32%, or 15 to less than 32%, or 20 to less than 32%, or 25 to less than 32%, or 5 to 30%, or 10 to 30%, or 15 to 30%, or 20 to 30%, or 25 to 30%, based on the total weight of the cellulose ester polymer.

In certain embodiments, the cellulose ester is cellulose propionate butyrate, or cellulose acetate propionate butyrate, with the combined propionyl and butyryl content as a percentage of total weight of the polymer in the range from 15% to 55%, or 15% to 50%, or 15% to 45%, or 15% to 40%, or 15% to 35%, or 15% to 30%, or 15% to 25%, or 15% to 20%, or 20% to 55%, or 20% to 50%, or 20% to 45%, or 20% to 40%, or 20% to 35%, or 20% to 30%, or 20% to 25%, or 25% to 55%, or 25% to 50%, or 25% to 45%, or 25% to 40%, or 25% to 35%, or 25% to 30%, or 30% to 55%, or 30% to 50%, or 30% to 45%, or 30% to 40%, or 30% to 35%, or 35% to 55%, or 35% to 50%, or 35% to 45%, or 35% to 40%, 40% to 55%, or 40% to 50%, or 40% to 45%, or 40% to 55%, or 40% to 55%, or 40% to 55%, or 40% to 45%, or 45% to 55%, or 45% to 50%, or 50% to 55%.

Any of the cellulose esters discussed above can also contain up to 10% residual hydroxyl units, preferably 0.5% to 5%.

In embodiments of the invention, the terminology "PBS Polymer" can be used interchangeably with polymeric aliphatic polyester ("PAP"), where PAP is a polymeric aliphatic polyester that comprises residues of one or more $C_2$ to $C_4$ alkane diols and residues of one or more $C_4$ to $C_8$ alkyl dicarboxylic acids, or comprises residues of a ring-opened lactone. In embodiments, the PAP comprises residues of a $C_2$ to $C_4$ alkane diol and residues of $C_4$ to $C_6$ alkyl dicarboxylic acid. In embodiments, the PAP comprises residues of ethylene glycol or 1,4-butanediol and residues of succinic acid, glutaric acid or adipic acid. In embodiments, the PAP comprises residues of ethylene glycol or 1,4-butanediol and residues of succinic acid. In embodiments, the PAP is chosen from poly(butylene succinate) or poly(ethylene succinate). In embodiments, the PAP is chosen from poly(butylene adipate) or poly(ethylene adipate). In embodiments, the PAP is poly(butylene succinate) (PBS). In another embodiment, the aliphatic polyester comprises residues of the ring opening of a lactone (cyclic ester) such as caprolactone. In embodiments, the PAP can be a copolymer. In embodiments, the PAP has a number average molecular weight (Mn) greater than 2000, or 3000 or higher, or 5000 or higher, or 7000 or higher, or 8000 or higher, or 9000 or higher, or 9500 or higher, or 10000 or higher. In embodiments, the PAP has a number average molecular weight (Mn) in the range from 5000 to 20000, or 8000 to 20000, or 8000 to 15000, or 9000 to 12000. Molecular weight (and Mn) can be determined using gel permeation chromatography (GPC) with a refractive index detector and polystyrene standards employing a solvent of methylene chloride. In an embodiment, the PAP is poly(butylene succinate) having a Mn in the range from 5000 to 20000; or 10000 to 20000; or 15000 to 20000.

In embodiments of the invention, the PBS Polymer (or PAP) can be any poly(butylene succinate) material. In embodiments, the PBS Polymer (or PAP) can be chosen from PBS random copolymers that are obtained from succinic acid or succinate, 1,4-butanediol, and other dicarboxylic acids or alkylenediols, such as adipic acid, glutaric acid, succinic acid with substituted side groups, suberic acid, 1,3-propanediol, and other substituted glycols. Examples of poly(butylene succinate) materials include, but are not limited to, poly(butylene succinate-co-butylene adipate) (PBSA), poly(butylene succinate-co-butylene terephthalate), poly(butylene succinate-co-propylene succinate), poly(butylene succinate-co-butylene methylsuccinate), poly(butylene succinate-co-butylene dimethylsuccinate), poly(butylene succinate-co-butylene phenylsuccinate), and blends of poly(butylene succinate) containing poly(butylene adipate), poly(ethylene succinate), and/or poly(ethylene adipate). In one embodiment, the PBS Polymer (or PAP) is poly(butylene succinate) (PBS).

In certain embodiments, the MFR of the PAP measured at 190° C. with a 2.16 kg load as per ASTM Test Method D1238 is less than 30, or less than 25, or less than 20, or less than 15, or less than 10, or less than 6, or about 5 or less. In embodiments, the PAP has an MFR of at least 0.5, or 1, or 2.

In embodiments, the PBS Polymers (or PAPs) have an MFR (190° C., 2.16 kg) in the range of 0.5-30, or 0.5-25, or 0.5-20, or 0.5-15, or 0.5-10, or 0.5-6, or 0.5-5. In embodiments, the PBS Polymers (or PAPs) have Elongation at Break of 100% or greater, or 150% or greater, or 200% or greater, or 250% or greater. In one embodiment, the cellulose ester composition contains at least one PBS Polymer (or PAP) having an MFR (190° C., 2.16 kg) of 10 or less and Elongation at Break of 100% or greater. In certain embodiments, the amount of such a PBS Polymer (or PAP) in the cellulose ester composition is from 0.5 to 40 wt %, or 1 to 35 wt %, or 2 to 30 wt %, or 2 to 20 wt %, or 2 to 10 wt %, or 2.5 to 30 wt %, or 5 to 30 wt %, or 5 to 25 wt %, or 5 to 20 wt %, or 5 to 15 wt %, or 7 to 18 wt %, or 8 to 12 wt %, based on the total cellulose ester composition. In certain embodiments, the composition contains at least one impact modifier, at least one monomeric plasticizer in addition to the PBS Polymer (or PAP), and the amount of the PBS Polymer (or PAP) in the cellulose ester composition is from 0.5 to 40 wt %, or 1 to 35 wt %, or 2 to 30 wt %, or 2 to 20 wt %, or 2 to 10 wt %, or 3 to 10 wt %, or 3 to 8 wt %, or 3 to 7 wt %, or 4 to 8 wt %; or 4 to 7 wt %, based on the total cellulose ester composition.

In one embodiment, one or more impact modifiers can be included with the PBS Polymers (or PAPs), and, in certain embodiments, the impact modifiers can be any polymeric material classified as an elastomer with a glass transition temperature (Tg) below room temperature. Tg can be measured for example according to ASTM D3418 using a TA 2100 Thermal Analyst Instrument using a scan rate of 20° C./min. Several classes of impact modifier fit this description.

In one embodiment, the impact modifier can be selected from the class of materials known as modified polyolefins (or olefin copolymers). In this class, the olefin is copolymerized with additional monomers that limit the crystallization of the polymer, increase the amount of the chain with Tg below room temperature, and reduce the modulus below 500 MPa. Examples of modified olefins include ethylene methyl acrylate (EMA) (examples include Elvaloy 4051, Lotader 3410 and Lotader 8900), ethylene butyl acetate (EBA), ethylene vinyl acetate (EVA) (examples include Levamelt 500, Levamelt 600, Levamelt 700, Levamelt 800, Elvax 40W, Evatane 28-40, Evatane 40-55, Evatane 18-150, Bynel E418 and Bynel 3101), ethylene ethyl acetate (EEA), ethylene propylene diene monomer based elastomers (EPDM) (examples include Royaltuf 498), and ethylene propylene rubber elastomers (EPR).

In one embodiment, the impact modifier can be a block copolymer in which at least one segment of the chain has a Tg below room temperature, referred to as the soft segment, and at least one segment of the chain has a Tg or Tm above room temperature, referred to as the hard segment. These block copolymers are also commonly referred to as thermoplastic elastomers (TPEs). Examples of block compolymers of this class include styrenic materials such as poly(styrene-butadiene-styrene) (SBS), poly(styrene-ethylene-butylene-styrene) (SEBS), and styrene-isoprene-rubber elastomers (SIS) (examples include Kraton G1657MS, Kraton FG1901 G and Kraton FG1924 G); thermoplastic urethanes (TPU) (examples include Elastolan 1170Z, Estane 2355, Estane ALR CL87A and Estane ALR 72A); polyester-ether copolymers (examples include Ecdel 9966 and Hytrel 3078) or polyamide-ether copolymers (examples include Pebax 5533).

In one embodiment, the impact modifier can be selected from the class of emulsion-prepared materials known as core-shell impact modifiers. In one embodiment, the impact modifier is an MBS core-shell impact modifier such as a methacrylate-butadiene-styrene that has a core made out of butadiene-styrene copolymers and shell made out of methyl methacrylate-styrene copolymer. In another embodiment, the impact modifier is an acrylic core-shell impact modifier that has a core made from an acrylic polymer, such as butyl acrylate or styrene butyl acrylate, and shell from made from polymethylmethacrylate or styrene methylmethacryalate copolymer.

In embodiments, the MBS impact modifier can comprise graft polymer compositions comprising 10 to 70 percent by weight of a polymer or a copolymer of butadiene and grafts of firstly methyl(meth)acrylate and cross-linker, and secondly of styrene, and thirdly of methyl(meth)acrylate with an optional cross-linker.

Monomers suitable for polymerization with a conjugated diolefin and preferably with butadiene, can include alkenyl aromatic compounds and preferably vinyl aromatic compounds such as styrene, divinylbenzene, alpha-methyl styrene, vinyl toluene, hydrogenated styrene; lower (CZ—Cu) alkyl acrylates such as ethyl acrylate, n-propylacrylate, n-butyl acrylate, Z-methylbutylacrylate, 3-methylbutyl acrylate, amylacrylate, n-hexylacrylate, Z-ethylhexyl acrylate; lower ($C_2$-$C_{12}$) alkyl(meth)acrylates; acrylonitriles; olefins; and the like; or a combination of any of the foregoing.

Suitable cross-linking agents include divinylbenzene; di(meth)acrylates; diacrylates such as the diacrylate of mono-, di- or polyethylene glycol; their (meth)acrylates; divinyl sulfide; divinyl ether; vinyl acrylate; vinyl(meth) acrylate; trivinylbenzene; trimethylolpropane; tri(meth) acrylate; triallyl cyanurate and triallyl isocyanurate.

In one embodiment, the MBS core-shell impact modifier can comprise a copolymer of butadiene and styrene and most preferably a terpolymer of butadiene, styrene, and divinylbenzene. Although the relative amounts of the monomers which comprise the copolymeric substrate may vary, the butadiene component will typically comprise from about 30 to 100 parts by weight, the styrene component will comprise from 0 to about 70 parts by weight, and the divinylbenzene component will comprise from 0 to about 5 parts by weight based upon 100 parts by weight of butadiene, styrene, and divinylbenzene combined. In an embodiment, the copolymer substrate can comprise from about 50 to about 90 parts by weight of butadiene, from about 10 to about 50 parts by weight of styrene, and from 0 to about 5 parts by weight of divinylbenzene on the same basis, and most preferably, from about 65 to about 85 parts by weight of butadiene, from about 15 to about 35 parts by weight of styrene, and from about 0.5 to about 2.0 parts by weight of divinylbenzene on the same basis.

Examples of methacrylate-butadiene-styrene core shell polymers are those described in, but not limited to, patents U.S. Pat. Nos. 4,446,585, 5,534,594, and 6,331,580. MBS core-shell impact modifiers can be obtained as Kane Ace B564 from Kaneka, Clearstrength from Arkema, Metablen C and Metablen E from Mitsubishi Chemical, Paraloid from Dow, and Visiomer from Evonik.

In one embodiment of the present invention, the core shell impact modifier is an acrylic impact modifier comprising about 25 to 95 weight percent of a first elastomeric phase polymerized from a monomer system comprising about 75 to 99.8 percent by weight of a ($C_1$ to $C_6$) alkyl acrylate, 0.1 to 5 percent by weight cross-linking monomer, and 0.1 to 5 percent by weight graft linking monomer, and about 75 to 5 weight percent of a final, rigid thermoplastic phase free of epoxy groups polymerized in the presence of said elastomeric phase.

Examples of useful acrylates are methyl acrylate, ethyl acrylate, butyl acrylate, 2-ethylhexyl acrylate and the like. In some embodiments, the acrylates are n-butyl acrylate and ethyl acrylate.

Graft linking monomer is defined as polyethylenically unsaturated monomer which has both a highly reactive double bond and a double bond of lower reactivity such that the highly reactive double bond tends to polymerize during the first stage monomer polymerization leaving a remaining double bond for polymerization during the next stage polymerization and thereby to graft link the first stage with the second stage polymers. In some embodiments, the graft linking monomers are allyl methacrylate, allyl acrylate and diallyl maleate. In an embodiment, 0.05 to 3 percent graft linking monomer is present based on first stage monomer systems. Cross linking monomer is also preferably present, generally in amounts of about 0.05 to 3 percent by weight based on first stage monomer system, and is defined as a polyethylenically unsaturated monomer having at least two double bonds of about equal reactivity so as to cause cross-linking in the first stage polymerization. Examples of typical cross-linking monomers are 1,3-butylene diacrylate, 1,3-butylene dimethacrylate, divinylbenzene and the like.

By "epoxy functionality" is meant the epoxy units which are pendant from the final stage polymer. In some embodiments, epoxy functionality is incorporated into the final stage polymer by use of epoxy containing monomer such as glycidyl acrylate or glycidyl methacrylate in the final stage monomer mixture.

Examples of acrylic core shell polymers are those described in, but not limited to, patents U.S. Pat. Nos. 3,448,173, 3,655,825, and 3,853,968. Examples of suitable acrylic impact modifiers are Kane Ace EC0100 and M570 from Kaneka, Durastrength from Arkema, Elvaloy and Elvaloy HP from DuPont, Metablen W from Mitsubishi Chemical, and Paraloid from Dow.

In one class of this embodiment, the impact modifier is an ABS core-shell impact modifier that has a core made out of butadiene-styrene copolymers and shell made out of acrylonitrile-styrene copolymer. Examples of ABS core-shell impact modifiers include Blendex from Galata Chemicals and Elix from Elix Polymers.

In one class of this embodiment, the impact modifier is a silicone-acrylic core-shell impact modifier that has a core made out of silicone-acrylic rubber and shell made out of PMMA copolymer or methyl methacrylate-styrene copolymer. Examples of silicone-acrylic core-shell impact modifiers include an Metablen S from Mitsubishi Chemical Company.

In one embodiment, the impact modifier has a neutral acidity. It is believed that this will help prevent the cellulose esters from degrading during the melt processing of the compositions.

In one embodiment, the impact modifier can be either a non-reactive impact modifier or a reactive impact modifier, or combination of both. The impact modifiers used can also improve mechanical and physical properties of the cellulose ester compositions.

In one embodiment, where non-reactive impact modifiers are utilized, the impact modifier contains a first polymeric chain segment that is more chemically or physically compatible with the cellulose ester than another polymeric chain segment. In an embodiment, the first segment contains polar functional groups, which provide compatibility with the cellulose ester, including, but not limited to, such polar functional groups as ethers, esters, amides, alcohols, amines, ketones and acetals. Compatibility is defined by the preferential interaction of the first polymer chain segment with the cellulose ester polymer relative to the second segment and can mean molecular scale or microscale interactions. The first segment may consist of oligomers or polymers of the following: cellulose esters; cellulose ethers; polyoxyalkylene, such as, polyoxyethylene, polyoxypropylene, polyoxybutylene; polyglycols, such as, polyethylene glycol, polypropylene glycol, polybutylene glycol; polyesters, such as, polycaprolactone, polylactic acid, aliphatic polyesters, aliphatic-aromatic copolyesters; polyacrylates and polymethacrylates; polyacetals; polyvinylpyrrolidone; polyethylenevinyl acetate; polyvinyl acetate; and polyvinyl alcohol. In one embodiment, the first segment is polyethylenevinyl acetate; polyoxyethylene or polyvinyl alcohol.

In embodiments, the second segment can be either saturated or unsaturated hydrocarbon groups or contain both saturated and unsaturated hydrocarbon groups. The second segment can be an oligomer or a polymer. In one embodiment of the invention, the second segment of the non-reactive impact modifier is selected from the group consisting of polyolefins, polydienes, polyaromatics, and copolymers. An example of a polyaromatic second segment is polystyrene. An example of a copolymer second segment is styrene/butadiene copolymer.

The first and second segments of the non-reactive impact modifiers can be in a diblock, triblock, branched or comb structure. The molecular weight, weight average (Mw), of the non-reactive impact modifiers can range from about 300 to about 20,000 or from about 500 to about 10,000 or from about 1,000 to about 5,000. The segment ratio of the non-reactive impact modifiers can range from about 15 to about 85% polar first segments to about 15 to about 85% nonpolar second segments.

Examples of non-reactive impact modifiers include, but are not limited to, ethoxylated alcohols, ethoxylated alkylphenols, ethoxylated fatty acids, polyethylenevinyl acetate, block polymers of propylene oxide and ethylene oxide, ethylene/propylene terpolymers, functionalized polyolephins, polyglycerol esters, polysaccharide esters, and sorbitan esters. Examples of ethoxylated alcohols are $C_{11}$-$C_{15}$ secondary alcohol ethoxylates, polyoxyethylene cetyl ether, polyoxyethylene stearyl ether, and $C_{12}$-$C_{14}$ natural liner alcohol ethoxylated with ethylene oxide. $C_{11}$-$C_{15}$ secondary ethyoxylates can be obtained as Dow Tergitol® 15S from the Dow Chemical Company. Polyoxyethlene cetyl ether and polyoxyethylene stearyl ether can be obtained from ICI Surfactants under the Brij® series of products. $C_{12}$-$C_{14}$ natural linear alcohol ethoxylated with ethylene oxide can be obtained from Hoechst Celanese under the Genapol® series of products. Examples of ethoxylated alkylphenols include octylphenoxy poly(ethyleneoxy)ethanol and nonylphenoxy poly(ethyleneoxy)ethanol. Octylphenoxy poly(ethyleneoxy)ethanol can be obtained as Igepal® CA series of products from Rhodia, and nonylphenoxy poly(ethyleneoxy)ethanol can be obtained as Igepal CO series of products from Rhodia or as Tergitol® NP from Dow Chemical Company. Ethyoxylated fatty acids can include polyethyleneglycol monostearate or monolaruate which can be obtained from Henkel under the Nopalcol® series of products. Block polymers of propylene oxide and ethylene oxide can be obtained under the Pluronic® series of products from BASF. Polyglycerol esters can be obtained from Stepan under the Drewpol® series of products. Polysaccharide esters can be obtained from Henkel under the Glucopon® series of products, which are alkyl polyglucosides. Sorbitan esters can be obtained from ICI under the Tween® series of products.

In another embodiment of the invention, the non-reactive impact modifiers can be synthesized in situ in the cellulose ester composition by reacting cellulose ester-compatible compounds. These compounds can be, for example, telechelic oligomers, which are defined as prepolymers capable of entering into further polymerization or other reaction through their reactive end groups. In one embodiment of the invention, these in situ impact modifiers can have higher molecular weight, weight average (Mw), from about 10,000 to about 1,000,000.

In another embodiment of the invention, the impact modifier can be reactive. The reactive impact modifier can comprise a polymer or oligomer compatible with one component of the composition and functionality capable of reacting with another component of the composition. In embodiments, there are two types of reactive impact modifiers that can be used. The first reactive impact modifier has a hydrocarbon chain that is compatible with the cellulose ester and also has functionality capable of reacting with the cellulose ester. Such functional groups include, but are not limited to, carboxylic acids, anhydrides, acid chlorides, epoxides, and isocyanates. Specific examples of this type of reactive impact modifier include, but are not limited to: long chain fatty acids, such as, stearic acid (octadecanoic acid); long chain fatty acid chlorides, such as, stearoyl chloride (octadecanoyl chloride); long chain fatty acid anhydrides, such as, stearic anhydride (octadecanoic anhydride); epoxidized oils and fatty esters; styrene maleic anhydride copolymers; maleic anhydride grafted polypropylene; copolymers of maleic anhydride with olefins and/or acrylic esters, e.g. terpolymers of ethylene, acrylic ester and maleic anhydride; and copolymers of glycidyl methacrylate with olefins and/or acrylic esters, e.g. terpolymers of ethylene, acrylic ester, and glycidyl methacrylate.

Reactive impact modifiers can be obtained as SMA® 3000 styrene maleic anhydride copolymer from Sartomer/Cray Valley, Eastman G-3015® maleic anhydride grafted polypropylene from Eastman Chemical Company, Epolene® E-43 maleic anhydride grafted polypropylene obtained from Westlake Chemical, Lotader® MAH 8200 random terpolymer of ethylene, acrylic ester, and maleic anhydride obtained from Arkema, Lotader® GMA AX 8900 random terpolymer of ethylene, acrylic ester, and glycidyl methacrylate, and Lotarder® GMA AX 8840 random terpolymer of ethylene, acrylic ester, and glycidyl methacrylate.

Reactive polyolefin impact modifiers can be obtained as Lotader, Fusabond, Elvloy PTW, Lotryl, Elvaloy AC, InterLoy).

The second type of reactive impact modifier has a polar chain that is compatible with the cellulose ester and also has functionality capable of reacting with the cellulose ester. Examples of these types of reactive impact modifiers include cellulose esters or polyethylene glycols with olefin or thiol functionality. Reactive polyethylene glycol impact modifiers with olefin functionality include, but are not limited to, polyethylene glycol allyl ether and polyethylene glycol acrylate. An example of a reactive polyethylene glycol impact modifier with thiol functionality includes polyethylene glycol thiol. An example of a reactive cellulose ester impact modifier includes mercaptoacetate cellulose ester.

In embodiments of the invention, the amount of impact modifier in the cellulose ester composition can range from about 1 wt % to about 15 wt %, or from about 2 wt % to about 10 wt %, or from about 4 wt % to about 10 wt %, or from about 4 wt % to about 8 wt %, or from about 5 wt % to about 10 wt %, based on the weight of the cellulose ester composition. In certain embodiments, the cellulose ester composition comprises 55 to 98 wt % of at least one cellulose ester, preferably CAP; 1 to 30 wt % of at least one PBS Polymer (or PAP), preferably a PBS having an MFR (190° C., 2.16 kg) less than 25 and Elongation at Break of 100% or greater; and 1 to 15 wt % of at least one impact modifier, preferably an acrylic core-shell impact modifier. In embodiments containing impact modifier, the CAP contains greater than 10%, or greater than 20%, or greater than 30%, or greater than 40%, or greater than 45%, by weight propionyl.

In one embodiment, the cellulose ester composition is transparent, with light transmission of at least 70%, or at least 75%, or at least 80%, or at least 85%, or at least 90%, measured according to ASTM D1003 using a 3.2 mm plaque after injection molding at a barrel set point of 249° C. and a residence time of 5 min. In certain embodiments, the polymer-based resin has transmission in the range from 70% to 95%, or 75% to 95%, or 80% to 95%, or 85% to 95%, or 90% to 95%, or 70% to 90%, or 75% to 90%, or 80% to 90%, or 85% to 90%, measured according to ASTM D1003 using a 3.2 mm plaque after injection molding at a barrel set point of 249° C. and a residence time of 5 min. In one class of this embodiment, the cellulose ester composition comprising the PBS Polymer (or PAP) has a percent haze of less than 10%. In embodiments, the cellulose ester composition comprising the PBS Polymer (or PAP) has a percent haze of less than 8%, or less than 6%, or less than 5%.

In another embodiment, the refractive index (RI) of the PBS Polymer (or PAP) is sufficiently close to that of the cellulose ester(s) to provide a composition with high transmission and low haze. In one embodiment, the PBS Polymer (or PAP) has a RI that is close to the RI of the cellulose ester of about 1.46-1.48 to provide clear compositions. In embodiments, the PBS Polymer (or PAP) and cellulose ester components have a difference in refractive index, RI(second component)−RI(first component) (e.g., RI of CE−RI of PBS), of about 0.006 to about −0.0006, and the blend has a percent transmittance of at least 75%, and a haze of 10% or less, and more preferably 5% or less.

In embodiments of the invention, the amount of PBS Polymer (or PAP) in the cellulose ester composition can range from about 0.5 wt % to about 40 wt %, or from about 1 wt % to about 35 wt %, or 2 to 30 wt %, or 2 to 20 wt %, or 2 to 10 wt %, or from about 2.5 wt % to about 30 wt %, or from about 5 wt % to about 25 wt %, or from about 5 wt % to about 20 wt %, or from about 5 wt % to about 15 wt %, or from about 5 wt % to about 10 wt %, or from about 10 wt % to about 30 wt %, or from about 10 wt % to about 25 wt %, or from about 10 wt % to about 20 wt %, or from about 10 wt % to about 15 wt %, or from greater than 10 wt % to about 30 wt %, or from greater than 10 wt % to about 25 wt %, or from greater than 10 wt % to about 20 wt %, or from greater than 10 wt % to about 15 wt %, based on the weight of the cellulose ester composition. In embodiments, the composition contains at least one impact modifier and/or at least one monomeric plasticizer in addition to the PBS Polymer (or PAP), and the amount of the PBS Polymer (or PAP) in the cellulose ester composition is from 0.5 to 40 wt %, or 1 to 35 wt %, or 2 to 30 wt %, or 2 to 20 wt %, or 2 to 10 wt %, or 3 to 10 wt %, or 3 to 8 wt %, or 3 to 7 wt %, or 4 to 8 wt %; or 4 to 7 wt %, based on the total cellulose ester composition.

In another embodiment of the invention, the cellulose ester compositions further comprise at least one additional polymeric component as a blend (with the cellulose ester) in an amount from 5 to 95 weight %, based on the total cellulose ester composition. Suitable examples of the additional polymeric component include, but are not limited to, nylon; polyesters; polyamides; polystyrene; other cellulose esters, cellulose ethers; polystyrene copolymers; styrene acrylonitrile copolymers; polyolephins; polyurethanes; acrylonitrile butadiene styrene copolymers; poly(methylmethacrylate); acrylic copolymers; poly(ether-imides); polyphenylene oxides; polyvinylchloride; polyphenylene sulfides; polyphenylene sulfide/sulfones; poly(ester-carbonates); polycarbonates; polysulfones; poly lactic acid; polysulfone ethers; and poly(ether-ketones) of aromatic dihydroxy compounds; or mixtures of any of the foregoing polymers. The blends can be prepared by conventional processing techniques known in the art, such as melt blending or solution blending. In certain embodiments, the total amount of additional polymeric compounds (not including the PBS Polymer (or PAP)) is less than 25 wt %, or less than 20 wt %, or less than 15 wt %, or less than 10 wt %, or less than 5 wt %, or none, based on the total weight of the cellulose ester composition.

In one embodiment of the invention, in addition to the PBS Polymer (or PAP) (and impact modifier), the composition can contain a monomeric plasticizer. In embodiments, the monomeric plasticizer utilized in this invention can be any that is known in the art that can reduce the glass transition temperature and/or the melt viscosity of the cellulose ester to improve melt processing characteristics. The monomeric plasticizer may be any monomeric plasticizer suitable for use with a cellulose ester (that is added in addition to the PBS Polymer (or PAP) and impact modifier contained in the composition). The monomeric plasticizer level should be lower than the normal (or typical) monomeric plasticizer level utilized in conventional/commercial cellulose esters; so that the compositions have higher Tg than fully plasticized cellulose ester compositions, good toughness and good flow. In embodiments, the monomeric plasticizer is present in an amount that does not substantially reduce the Tg of the cellulose ester composition compared to a similar composition without the monomeric plasticizer. In embodiments, the Tg does not change (e.g., reduce) more than 20%, or 15%, or 10%, or 5%, or 2%, as a result of including the monomeric plasticizer.

In one embodiment, the monomeric plasticizer is at least one selected from the group consisting of an aromatic phosphate ester plasticizer, alkyl phosphate ester plasticizer, dialkylether diester plasticizer, tricarboxylic ester plasticizer, polymeric polyester plasticizer, polyglycol diester plasticizer, polyester resin plasticizer, aromatic diester plasticizer, aromatic triester plasticizer, aliphatic diester plasticizer, carbonate plasticizer, epoxidized ester plasticizer, epoxidized oil plasticizer, benzoate plasticizer, polyol benzoate plasticizer, adipate plasticizer, a phthalate plasticizer, a glycolic acid ester plasticizer, a citric acid ester plasticizer, a hydroxyl-functional plasticizer, or a solid, non-crystalline resin plasticizer.

In one embodiment of the invention, the monomeric plasticizer can be selected from at least one of the following: triphenyl phosphate, tricresyl phosphate, cresyldiphenyl phosphate, octyldiphenyl phosphate, diphenylbiphenyl phosphate, trioctyl phosphate, tributyl phosphate, diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl) citrate, diethylene glycol dibenzoate, dipropylene glycol dibenozoate, or triethylene glycol dibenzoate.

In another embodiment of the invention, the monomeric plasticizer can be selected from at least one of the following: esters comprising: (i) acid residues comprising one or more residues of: phthalic acid, adipic acid, trimellitic acid, succinic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms.

In another embodiment of the invention, the monomeric plasticizer can be selected from at least one of the following: esters comprising: (i) at least one acid residue selected from the group consisting of phthalic acid, adipic acid, trimellitic acid, succinic acid, benzoic acid, azelaic acid, terephthalic acid, isophthalic acid, butyric acid, glutaric acid, citric acid and phosphoric acid; and (ii) at least one alcohol residue selected from the group consisting of aliphatic, cycloaliphatic, and aromatic alcohol containing up to about 20 carbon atoms.

In another embodiment of the invention, the monomeric plasticizer can comprise alcohol residues where the alcohol residues is at least one selected from the following: stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol.

In another embodiment of the invention, the monomeric plasticizer can be selected from at least one of the following: benzoates, phthalates, phosphates, arylene-bis(diaryl phosphate), and isophthalates. In another embodiment, the monomeric plasticizer comprises diethylene glycol dibenzoate, abbreviated herein as "DEGDB".

In another embodiment of the invention, the monomeric plasticizer can be chosen from aliphatic compounds comprising $C_2$-$C_{10}$ diacid residues, for example, malonic acid, succinic acid, glutaric acid, adipic acid, pimelic acid, suberic acid, azelaic acid, and sebacic acid; and $C_2$-$C_{10}$ diol residues.

In another embodiment, the monomeric plasticizer can comprise diol residues which can be residues of at least one of the following $C_2$-$C_{10}$ diols: ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, and tetraethylene glycol.

In another embodiment of the invention, the monomeric plasticizer comprises at least one of the following: Resoflex® R296 plasticizer, Resoflex® 804 plastocizer, SHP (sorbitol hexapropionate), XPP (xylitol pentapropionate), XPA (xylitol pentaacetate), GPP (glucose pentaacetate), GPA (glucose pentapropionate) and APP (arabitol pentapropionate).

In another embodiment of the invention, the monomeric plasticizer comprises one or more of: A) from about 5 to about 95 weight % of a $C_2$-$C_{12}$ carbohydrate organic ester, wherein the carbohydrate comprises from about 1 to about 3 monosaccharide units; and B) from about 5 to about 95 weight % of a $C_2$-$C_{12}$ polyol ester, wherein the polyol is derived from a C or C carbohydrate. In one embodiment, the polyol ester does not comprise or contain a polyol acetate or polyol acetates.

In another embodiment, the monomeric plasticizer comprises at least one carbohydrate ester and the carbohydrate portion of the carbohydrate ester is derived from one or more compounds selected from the group consisting of glucose, galactose, mannose, xylose, arabinose, lactose, fructose, sorbose, sucrose, cellobiose, cellotriose and raffinose.

In another embodiment of the invention, the monomeric plasticizer comprises at least one carbohydrate ester and the carbohydrate portion of the carbohydrate ester comprises one or more of α-glucose pentaacetate, β-glucose pentaacetate, α-glucose pentapropionate, β-glucose pentapropionate, α-glucose pentabutyrate and β-glucose pentabutyrate.

In another embodiment, the monomeric plasticizer comprises at least one carbohydrate ester and the carbohydrate portion of the carbohydrate ester comprises an α-anomer, a β-anomer or a mixture thereof.

In another embodiment, the monomeric plasticizer can be selected from at least one of the following: propylene glycol dibenzoate, glyceryl tribenzoate, diethylene glycol dibenzoate, triethylene glycol dibenzoate, di propylene glycol dibenzoate, and polyethylene glycol dibenzoate.

In another embodiment of the invention, the monomeric plasticizer can be a solid, non-crystalline resin. These resins can contain some amount of aromatic or polar functionality and can lower the melt viscosity of the cellulose esters. In one embodiment of the invention, the monomeric plasticizer can be a solid, non-crystalline compound (resin), such as, for example, rosin; hydrogenated rosin; stabilized rosin, and their monofunctional alcohol esters or polyol esters; a modified rosin including, but not limited to, maleic- and phenol-modified rosins and their esters; terpene resins; phenol-modified terpene resins; coumarin-indene resins; phenolic resins; alkylphenol-acetylene resins; and phenol-formaldehyde resins.

In another embodiment of the invention, the monomeric plasticizer is at least one monomeric plasticizer selected from the group consisting of: triacetin, trimethyl phosphate, triethyl phosphate, tributyl phosphate, triphenyl phosphate, triethyl citrate, acetyl trimethyl citrate, acetyl triethyl citrate, acetyl tributyl citrate, tributyl-o-acetyl citrate, dibutyl phthalate, diaryl phthalate, diethyl phthalate, dimethyl phthalate, di-2-methoxyethyl phthalate, di-octyl phthalate, di-octyl adipate, dibutyl tartrate, ethyl o-benzoylbenzoate, ethyl phthalyl ethyl glycolate, methyl phthalyl ethyl glycolate, n-ethyltoluenesulfonamide, o-cresyl p-toluenesulfonate, aromatic diol, substituted aromatic diols, aromatic ethers, tripropionin, tribenzoin, polycaprolactone, glycerin, glycerin esters, diacetin, glycerol acetate benzoate, polyethylene glycol, polyethylene glycol esters, polyethylene glycol diesters, di-2-ethylhexyl polyethylene glycol ester, triethylene glycol bis-2-ethyl hexanoate glycerol esters, diethylene glycol, polypropylene glycol, polyglycoldiglycidyl ethers, dimethyl sulfoxide, N-methyl pyrollidinone, $C_1$-$C_{20}$ dicarboxylic acid esters, dimethyl adipate, di-butyl maleate, di-octyl maleate, resorcinol monoacetate, catechol, catechol esters, phenols, epoxidized soy bean oil, castor oil, linseed oil, epoxidized linseed oil, other vegetable oils, other seed oils, difunctional glycidyl ether based on polyethylene glycol, γ-valerolactone, alkylphosphate esters, aryl phosphate esters, phospholipids, eugenol, cinnamyl alcohol, camphor, methoxy hydroxy acetophenone, vanillin, ethylvanillin, 2-phenoxyethanol, glycol ethers, glycol esters, glycol ester ethers, polyglycol ethers, polyglycol esters, ethylene glycol ethers, propylene glycol ethers, ethylene glycol esters, propylene glycol esters, polypropylene glycol esters, acetylsalicylic acid, acetaminophen, naproxen, imidazole, triethanol amine, benzoic acid, benzyl benzoate, salicylic acid, 4-hydroxybenzoic acid, propyl-4-hydroxybenzoate, methyl-4-hydroxybenzoate, ethyl-4-hydroxybenzoate, benzyl-4-hydroxybenzoate, diethylene glycol dibenzoate, dipropylene glycol dibenzoate, triethylene glycol dibenzoate, butylated hydroxytoluene, butylated hydroxyanisol, sorbitol, xylitol, ethylene diamine, piperidine, piperazine, hexamethylene diamine, triazine, triazole, pyrrole, and any combination thereof.

In embodiments, the amount of monomeric plasticizer in the cellulose ester composition can range from an amount greater than 0 to about 15 weight percent based on the weight of the cellulose ester composition, e.g., depending on the type of cellulose ester employed. In one embodiment, the amount can range up to about 15 weight percent based on the weight of the cellulose ester composition. In another embodiment, the amount can range up to about 10 weight percent based on the weight of the cellulose ester composition. In another embodiment, the amount can range up to about 5 weight percent based on the weight of the cellulose ester composition, or an amount less than 5 weight percent, or up to about 4 weight percent, or less than about 3 weight percent, based on the weight of the cellulose ester composition.

In an embodiment of the invention, the cellulose ester composition can further comprise a plasticizer (in addition to the monomeric plasticizer or in place of the monomeric plasticizer) chosen from one or more polyglycols, such as, for example, polyethylene glycol, polypropylene glycol, and polybutylene glycol. These can range from low molecular weight dimers and trimers to high molecular weight oligomers and polymers. In one embodiment, the molecular weight, weight average (Mw), of the polyglycol can range from about 200 to about 2000.

In embodiments, it should be understood that the cellulose ester composition can contain a material that falls within a category of materials that is generally known as or described herein as a monomeric plasticizer, but that is not considered to be a monomeric plasticizer for purposes of this invention provided that the material is of a specific type or included in an amount that provides (or contributes to) other functionality (other than plasticizer functionality), but that has minimal effect on lowering Tg or reducing melt flow viscosity, e.g., less than 1% or less than 0.5% change in such properties. For example, an epoxidized soy bean oil (e.g., Vikoflex 7170) may be added in small amounts (e.g., 1 wt % or less, based on the composition) to act as an acid scavenger to stabilize the composition and, although epoxidized oil or epoxidized soy bean oil can generally be categories of monomeric plasticizers, such a material shall not be considered to be a monomeric plasticizer (if it is free of other materials that would act as a plasticizer) and shall be excluded from the specified ranges of monomeric plasticizer (according to various embodiments disclosed herein).

In embodiments, the composition contains no polyether ester compounds. In embodiments, the composition contains no adipic acid compounds. In embodiments, the composition contains no tall oil fatty acid esters. In embodiments, the composition contains no aromatic fatty acid esters. In embodiments, the composition contains no acylated phenolated fatty acid esters or diesters. In embodiments, the composition contains no triethyl citrate.

In embodiments, the composition contains from 0 to 2 wt %, or 0 to 1.5 wt %, or 0 to 1 wt %, of a fatty acid ester. In embodiments, the composition contains from 0 to 2 wt %, or 0 to 1.5 wt %, or 0 to 1 wt %, of an epoxidized fatty acid ester, e.g., epoxidized soy bean oil. In embodiments, the composition contains from 0.1 to 2 wt %, or 0.1 to 1.5 wt %, or 0.1 to 1 wt %, of an epoxidized fatty acid ester. In embodiments, the composition contains from 0.1 to 2 wt %, or 0.1 to 1.5 wt %, or 0.1 to 1 wt %, of an epoxidized soy bean oil. In embodiments, the composition contains from 0.1 to 2 wt %, or 0.1 to 1.5 wt %, or 0.1 to 1 wt %, of an epoxidized fatty acid ester and contains less than 5 wt % of any other monomeric plasticizer. In embodiments, the composition contains from 0.1 to 2 wt %, or 0.1 to 1.5 wt %, or 0.1 to 1 wt %, of an epoxidized soy bean oil and contains less than 5 wt % of any other monomeric plasticizer.

In certain embodiments, the cellulose ester composition comprises 65-99 wt % of one or more cellulose esters, 1-35 wt % of one or more PBS Polymers (or PAPs), 1-35 wt % of one or more impact modifiers, 1-5 wt % of at least one monomeric plasticizer, and less than 10 wt % total of other components, based on the total weight of the cellulose ester composition. In certain embodiments, such other components do not include, polyether ester compounds or adipic acid compounds. In certain embodiments, the cellulose ester composition does not contain polyether ester compounds or camphor plasticizer.

In other embodiments of the invention, the cellulose ester composition comprises at least one cellulose ester, at least one PBS Polymer (or PAP), at least one impact modifier, and at least one monomeric plasticizer. In embodiments, the cellulose ester is CAP (e.g., CAP 482-20 from Eastman), the impact modifier is an acrylic core shell impact modifier (e.g., Kane Ace M570 impact modifier from Kaneka), the PBS Polymer (or PAP) is poly(butylene succinate) (e.g., PBS grade C or D from table 2), and the monomeric plasticizer is di-octyl adipate (DOA), where the total amount of the monomeric plasticizer is an amount 5 wt % or less, or less than 5 wt % (e.g., from 2 to less than 5 wt %, or 2 to 4 wt %) based on the total cellulose ester composition. In embodiments, the PBS Polymer (or PAP), impact modifier, and monomeric plasticizer are present in an amount sufficient to provide a cellulose ester composition having a Tg of at least 110° C., or at least 120° C., good impact strength properties, good gate strength, and good creep (resistance to deflection under load). In embodiments, the PBS Polymer (or PAP) is present in an amount from 2 to 10 wt %, or 3 to 8 wt %, or 3 to 7 wt %; the impact modifier is present in an amount from 2 to 10 wt %, or 4 to 8 wt %; the monomeric plasticizer is present in an amount from 1 to 5 wt %, or 1 to less than 5 wt %, or 2 to 4 wt %; all based on the total weight of the cellulose composition. In embodiments, the combined total amount of PBS Polymer (or PAP), impact modifier, and monomeric plasticizer is from 10 to 18 wt %, or 12 to 17 wt %, or 13 to 16 wt %, based on the total cellulose ester composition.

In another embodiment of the invention, the composition is melt processable. Melt processability generally refers to the ability to thermally process the materials below their degradation temperature to obtain homogeneous pellets or plastic articles. For example, the compositions described can be melt extruded on a Werner & Pflerderer 30 mm twin screw extruder at a throughput of 35 lbs/hour with screw speed of 250 rpm and barrel temperature of 240° C. and/or injection molded on a Toyo 110 injection molding machine with barrel temperature of 240° C. and mold temperature of 160° F. with minimal molecular weight degradation (e.g., less than 5% decrease in MW from the initial MW) or color degradation (e.g., less than 5% increase in haze or 5% decrease in transmission, based on a scale or 0 to 100%).

In one embodiment of this invention, a melt processable cellulose ester composition is provided comprising 1 wt % to 35 wt %, or 2.5 wt % to 30 wt %, 5 wt % to 15 wt % of PBS Polymers (or PAPs), and less than 5 wt % monomeric plasticizer, and a glass transition temperature (Tg) of at least 120° C. (measured at 20° C./min according to ASTM D3418 as described further herein), and notched Izod impact strength value of greater than 80, or 100, or 125, or 150 J/m (measured according to ASTM D256 on 3.2 mm thick bars at 23° C.), and spiral flow values of at least 38 centimeters (15 inches) when measured using the procedure described herein at a barrel temperate of 240° C. Unless specified otherwise, Notched Izod Impact Strength was performed on molded bars after notching according to ASTM Method D256 after conditioning at 23° C. and 50% RH for 48 hours, on 3.2 mm thick bars at 23° C.

Spiral flow was determined as follows: a reciprocating screw injection molding machine having 110 tons of clamping force with a screw diameter of 32 mm was equipped with a water-cooled, cold runner mold with a spiral-shaped cavity having dimensions of 0.50" wide×0.030" deep×60.00" in length was used. The cavity was fed via a 3.5" long cold sprue with a nominal 0.400" diameter and 3-degree taper, followed by a 1.0" long cold runner with 0.30" nominal diameter, followed by a rectangular gate 0.25" wide×0.030" thick×0.10" long. Variables controlled for the range of experimentation included resin drying, injection unit barrel temperature, mold temperature, initial injection speed, injection pressure limit, screw rotation speed and back pressure on screw recovery, injection time, and cycle time. For each combination of variables, responses included actual melt temperature and distance of melt travel in the spiral-shaped cavity, excluding the runner and gate. The injection process was allowed to stabilize at each set of conditions—typically 10 to 15 shots—and then 10 molded specimens were collected for an average reported flow length. All materials were molded using pressure control, with mold temperature of 120° F., initial injection speed of 1 in/s, injection unit pressure limit of 2000 psi, injection time of 5 s, cycle time of 32 s, maximum cushion of 0.2", screw recovery rotation speed of 150 rpm, and screw recovery back pressure of 100 psi.

In one embodiment, in addition to the PBS Polymer (or PAP), the melt processable cellulose ester compositions comprise greater than 0 to 15 wt % of impact modifiers, greater than 0 to 15 wt % of monomeric plasticizers, and have a Tg greater than 120° C. In one embodiment, in addition to the PBS Polymer (or PAP), the melt processable cellulose ester compositions comprise 1 to 8 wt %, or 1 to 5 wt %, or 1 to less than 5 wt % monomeric plasticizer, and a Tg greater than 110° C. In another embodiment, the melt processable cellulose ester compositions comprise greater than 0 to 15 wt % of impact modifiers, greater than 0 to 10 wt % of monomeric plasticizers, and a Tg greater than 130° C. In yet another embodiment, melt processable cellulose ester compositions comprise greater than 0 to 10 wt % of impact modifiers, greater than 0 to 10 wt % of monomeric plasticizers, and a Tg greater than 140° C. In another embodiment, melt processable cellulose ester compositions comprising greater than 0 to 10 wt % of impact modifiers, greater than 0 to 5 wt % of monomeric plasticizers, and a Tg greater than 1400. In one embodiment, the impact modifier is a core-shell impact modifier. In one embodiment, the impact modifier is an acrylic core shell impact modifier.

In embodiments of the invention, the polymer-based resin has a Tg greater than 100° C., or greater than 110° C., or greater than 120° C. In certain embodiments, the polymer-based resin has a Tg of at least 120° C., or at least 125° C., or at least 130° C., or at least 135° C., or at least 140° C., or at least 145° C., or at least 150° C., or at least 155° C., or at least 160° C. In certain embodiments, the polymer-based resin has a Tg in the range from 100° C. to 190° C., 100° C. to 185° C., 100° C. to 180° C., 100° C. to 175° C., 100° C. to 170° C., 110° C. to 190° C., 110° C. to 185° C., 115° C. to 190° C., 115° C. to 185° C., 120° C. to 190° C., 120° C. to 185° C., 125° C. to 190° C., 125° C. to 185° C., 130° C. to 190° C., 130° C. to 185° C., 135° C. to 190° C., 135° C. to 185° C., 140° C. to 190° C., 140° C. to 185° C., or 145° C. to 190° C.

In embodiments of the invention, the polymer-based resin has a notched izod impact strength of at least 80 J/m, or at least 90 J/m, or at least 100 J/m, or at least 110 J/m, or at least 120 J/m, or at least 130 J/m, or at least 140 J/m, or at least 150 J/m, or at least 160 J/m, or at least 170 J/m, or at least 180 J/m, or at least 190 J/m, or at least 200 J/m, as measured according to ASTM D256 using a 3.2 mm thick bar that has been subjected to 50% relative humidity for 48 hours at 23° C. In certain embodiments, the polymer-based resin has a notched izod impact strength in the range of from about 80 J/m to about 500 J/m, from about 80 J/m to about 400 J/m, from about 80 J/m to about 300 J/m, from about 80 J/m to about 200 J/m, from about 100 J/m to about 500 J/m, from about 100 J/m to about 400 J/m, from about 100 J/m to about 300 J/m, from about 100 J/m to about 200 J/m, from about 120 J/m to about 500 J/m, from about 120 J/m to about 400 J/m, from about 120 J/m to about 300 J/m, from about 120 J/m to about 200 J/m, from about 150 J/m to about 500 J/m, from about 150 J/m to about 400 J/m, from about 150 J/m to about 300 J/m, from about 150 J/m to about 200 J/m, from about 170 J/m to about 500 J/m, from about 170 J/m to about 400 J/m, from about 170 J/m to about 300 J/m, from about 170 J/m to about 200 J/m, from 180 J/m to about 500 J/m, from about 180 J/m to about 400 J/m, from about 180 J/m to about 300 J/m, from about 180 J/m to about 200 J/m, from 190 J/m to about 500 J/m, from about 190 J/m to about 400 J/m, from about 190 J/m to about 300 J/m, from about 190 J/m to about 200 J/m, from 200 J/m to about 500 J/m, from about 200 J/m to about 400 J/m, or from about 200 J/m to about 300 J/m, as measured according to ASTM D256 using a 3.2 mm thick bar that has been subjected to 50% relative humidity for 48 hours at 23° C.

In embodiments of the invention, the polymer-based resin has a gate impact strength of at least 80 J/m, or at least 90 J/m, or at least 100 J/m, or at least 110 J/m, or at least 120 J/m, or at least 130 J/m, or at least 140 J/m, or at least 150 J/m, or at least 160 J/m, or at least 170 J/m, or at least 180 J/m, or at least 190 J/m, or at least 200 J/m, as measured according to the method described in the Examples below. In certain embodiments, the polymer-based resin has a gate impact strength in the range of from about 80 J/m to about 300 J/m, from about 80 J/m to about 250 J/m, from about 80 J/m to about 200 J/m, from about 100 J/m to about 300 J/m, from about 100 J/m to about 250 J/m, from about 100 J/m to about 200 J/m, from about 120 J/m to about 300 J/m, from about 120 J/m to about 250 J/m, from about 120 J/m to about 200 J/m, from about 150 J/m to about 300 J/m, from about 150 J/m to about 250 J/m, from about 150 J/m to about 200 J/m, from about 170 J/m to about 300 J/m, from about 170 J/m to about 250 J/m, from about 170 J/m to about 200 J/m, from 180 J/m to about 300 J/m, from about 180 J/m to about 250 J/m, from about 180 J/m to about 200 J/m, from 190 J/m to about 300 J/m, from about 190 J/m to about 250 J/m, from about 190 J/m to about 200 J/m, from 200 J/m to about 300 J/m, from about 200 J/m to about 250 J/m, as measured according to the method described in the Examples below.

In embodiments of the invention, the polymer-based resin has a weld line impact strength of at least 80 J/m, or at least 90 J/m, or at least 100 J/m, or at least 110 J/m, or at least 120 J/m, or at least 130 J/m, or at least 140 J/m, or at least 150 J/m, or at least 160 J/m, or at least 170 J/m, or at least 180 J/m, or at least 190 J/m, or at least 200 J/m, as measured according to the method described in the Examples below. In certain embodiments, the polymer-based resin has a weld line impact strength in the range of from about 80 J/m to about 300 J/m, from about 80 J/m to about 250 J/m, from about 80 J/m to about 200 J/m, from about 100 J/m to about 300 J/m, from about 100 J/m to about 250 J/m, from about 100 J/m to about 200 J/m, from about 120 J/m to about 300 J/m, from about 120 J/m to about 250 J/m, from about 120 J/m to about 200 J/m, from about 150 J/m to about 300 J/m, from about 150 J/m to about 250 J/m, from about 150 J/m to about 200 J/m, from about 170 J/m to about 300 J/m, from about 170 J/m to about 250 J/m, from about 170 J/m to about 200 J/m, from 180 J/m to about 300 J/m, from about 180 J/m to about 250 J/m, from about 180 J/m to about 200 J/m, from 190 J/m to about 300 J/m, from about 190 J/m to about 250 J/m, from about 190 J/m to about 200 J/m, from 200 J/m to about 300 J/m, from about 200 J/m to about 250 J/m, as measured according to the method described in the Examples below.

In certain embodiments of the invention, 3.2 mm thick plaques of the polymer-based resin exhibit ductile failure as defined in section X1.8 of ASTM D3763 when tested by instrumented impact according to ASTM D3763.

In embodiments of the invention, the polymer-based resin has a flexural modulus of greater than 1600 MPa as measured according to ASTM D790 using a 3.2 mm thick bar that has been subjected to 50% relative humidity for 48 hours at 23° C. In certain embodiments, the polymer-based resin has a flexural modulus of at least 1700, at least 1800, at least 1900 MPa, at least 2000 MPa, at least 2100 MPa, at least 2200 MPa, at least 2300 MPa, or at least 2400 MPa, as measured according to ASTM D790 using a 3.2 mm thick bar that has been subjected to 50% relative humidity for 48 hours at 23° C. In certain embodiments, the polymer-based resin has a flexural modulus is in the range of from about 1600 to about 3000 MPa, from about 1700 to about 3000, from about 1800 to about 3000, from about 1900 to about 3000 MPa, from about 2000 to about 3000 MPa, from about 2100 to about 3000 MPa, from about 2200 to about 3000 MPa, from about 2300 to about 3000 MPa, from about 2400 to about 3000 MPa, or from about 2500 to about 3000 MPa, as measured according to ASTM D790 using a 3.2 mm thick bar that has been subjected to 50% relative humidity for 48 hours at 23° C. In certain embodiments, the polymer-based resin has a flexural modulus is in the range of from about 1600 to about 2500 MPa, from about 1700 to about 2500 MPa, from about 1700 to about 2500 MPa, from about 1900 to about 2500 MPa, from about 1900 to about 2800 MPa, or from about 1900 to about 3000 MPa, as measured according to ASTM D790 using a 3.2 mm thick bar that has been subjected to 50% relative humidity for 48 hours at 23° C.

In certain embodiments of the invention, the cellulose ester compositions contain 2.5 wt %-30 wt % PBS Polymer (or PAP), based on the total weight of the cellulose ester composition, have Tg values greater than 120° C., notched Izod impact strength values greater than 80, or 100, or 125, or 150, or 175, or 200 J/m, and a light transmission value greater than 80%, or at least 85%, or at least 90%, measured according to ASTM D1003 using a 3.2 mm plaque after injection molding at a barrel set point of 249° C. and a residence time of 5 min.

One problem that may occur when cellulose esters containing low levels of monomeric plasticizer are melt processed on screw plasticating injection molding machines is that the screw may have difficulty recovering smoothly, leading to poor material feed and a "squeaking" sound. It has surprisingly been found that addition of PBS Polymers (or PAPs) in accordance with embodiments of this invention can eliminate these problems during injection molding.

In certain embodiments of the invention, the cellulose ester compositions contain 2.5 wt %-30 wt % PBS Polymer (or PAP), based on the total weight of the cellulose ester composition, have Tg values greater than 120° C., notched Izod impact strength values greater than 80, or 100, or 125, or 150, or 175, or 200 J/m, and do not squeak or have screw recovery issues during injection molding at a barrel set point of 249° C.

In certain embodiments of the invention, the cellulose ester compositions contain 2.5 wt %-30 wt % PBS Polymer (or PAP), based on the total weight of the cellulose ester composition, have Tg values greater than 120° C., notched Izod impact strength values greater than 150, or 200 J/m, and a light transmission value greater than 80%, or at least 85%, or at least 90%, measured according to ASTM D1003 using a 3.2 mm plaque after injection molding at a barrel set point of 249° C. and a residence time of 5 min.

In certain embodiments of the invention, 3.2 mm thick plaques of the cellulose ester compositions containing 2.5 wt %-30 wt % PBS Polymer (or PAP), based on the total weight of the cellulose ester composition, exhibit ductile failure as defined in section X1.8 of ASTM D3763 when tested by instrumented impact according to ASTM D3763, and have Tg values greater than 120° C.

In another embodiment of the invention, the cellulose ester compositions further comprise at least one additive selected from the group comprising antioxidants, thermal stabilizers, mold release agents, antistatic agents, whitening agents, colorants, flow aids, processing aids, anti-fog additives, minerals, UV stabilizers, lubricants, chain extenders, nucleating agents, reinforcing fillers, wood or flour fillers, glass fiber, carbon fiber, flame retardants, dyes, pigments, colorants, additional resins and combinations thereof.

In certain embodiments, in addition to the PAP, e.g., PBS, impact modifier and monomeric plasticizer (discussed herein), the cellulose ester composition includes stabilizers selected from the group consisting of secondary antioxidants, acid scavengers, or a combination thereof. In certain embodiments, in addition to the PAP, e.g., PBS, impact modifier and monomeric plasticizer (discussed herein), the cellulose ester composition includes a secondary antioxidant in the range from about 0.1 to about 0.8 wt % based on the total weight of the composition. In certain embodiments, in addition to the PAP, e.g., PBS, impact modifier and monomeric plasticizer (discussed herein), the cellulose ester composition includes an acid scavenger in the range from about 0.2 to about 2.0 wt % based on the total weight of the composition. In one embodiment, in addition to the PAP, e.g., PBS, and optionally impact modifier and/or monomeric plasticizer (discussed herein), the cellulose ester composition includes a secondary antioxidant in the range from about 0.1 to about 0.8 wt % and an acid scavenger in the range from about 0.2 to about 2.0 wt % based on the total weight of the composition. In one embodiment, the secondary antioxidant is 3,9-bis(2,4-di-tert-butylphenoxy)-2,4,8,10-tetraoxa-3,9-diphosphaspiro[5.5]undecane. In one embodiment, the acid scavenger is an epoxidized fatty acid ester. In one embodiment, the cellulose ester composition further includes a salt stabilizer, for example in the range from about 0.1 to about 0.5 wt % based on the total weight of the composition. In one embodiment, other than the cellulose ester, PAP, e.g., PBS, and stabilizers (discussed herein), the cellulose ester composition contains a total of less than 10 wt %, or less than 8 wt %, or less than 5 wt %, or less than 2 wt %, of any other components, based on the total weight of the composition.

In another embodiment of the invention, a process for producing a cellulose ester composition is provided. The process comprises contacting at least one cellulose ester, at least one PBS Polymer (or PAP), at least one impact modifier and monomeric plasticizer. The cellulose ester, impact modifier, monomeric plasticizer, and PBS Polymers (or PAPs) were previously discussed in this disclosure. In one embodiment, the cellulose ester, PBS Polymers (or PAPs), impact modifiers and monomeric plasticizers can be mixed in any order of addition.

In another embodiment of this invention, a process for producing a cellulose ester composition is provided comprising: a) mixing at least one PBS Polymer (or PAP), at least one cellulose ester, at least one impact modifier and monomeric plasticizer for a sufficient time and temperature to disperse the PBS Polymer (or PAP) to produce the cellulose ester composition. A sufficient temperature is defined as the flow temperature of the cellulose ester which is generally about 50° C. above the Tg of the cellulose ester. In another embodiment, the temperature is about 80° C. above the Tg of the cellulose ester. In embodiments, the temperature at mixing is limited at the upper range by the processing temperature of the PBS Polymer (or PAP) and at the lower range by the highest use temperature of the cellulose ester composition.

The efficiency of mixing two or more viscoelastic materials can depend on the ratio of the viscosities of the viscoelastic materials. In an embodiment, for a given mixing equipment and shear rate range, the viscosity ratio of the dispersed phase (PBS Polymer (or PAP)) and continuous phase (cellulose ester) should be within specified limits for obtaining adequate particle size.

In embodiments, mixing of the PBS Polymers (or PAPs), cellulose esters, impact modifiers and monomeric plasticizers and any additives can be accomplished by any method known in the art that is adequate to disperse the PBS Polymers (or PAPs), impact modifiers, monomeric plasticizers and additives into the cellulose esters. Examples of mixing equipment include, but are not limited to, Banbury mixers, Brabender mixers, roll mills, and extruders (single or twin screw). The shear energy during the mixing is dependent on the combination of equipment, blade design, rotation speed (rpm), and mixing time. The shear energy should be sufficient to disperse the PBS Polymer (or PAP) and option impact modifier throughout the cellulose ester.

In embodiments, the cellulose ester, PBS Polymer (or PAP), impact modifier, monomeric plasticizer and additives can be combined in any order during the process. In one embodiment, the cellulose ester is premixed with the PBS Polymer (or PAP), impact modifier and the monomeric plasticizer. The cellulose ester containing the PBS Polymer (or PAP), impact modifier and the monomeric plasticizer is then mixed with the additives. In another embodiment of the invention, when reactive impact modifiers are utilized, the reactive impact modifiers can be mixed with the cellulose esters first, and then the other components are added.

The compositions of this invention are useful as molded plastic parts or as solid plastic objects. The compositions are suitable for use in any applications where hard clear plastics are required. Examples of such parts include disposable knives, forks, spoons, plates, cups, straws as well as eyeglass frames, toothbrush handles, toys, automotive trim, tool handles, camera parts, parts of electronic devices, razor parts, ink pen barrels, disposable syringes, bottles, and the like. In one embodiment, the compositions of the present invention are useful as plastics, films, fibers (including melt spinning fibers and solvent spinning fibers), and sheets. In one embodiment, the compositions are useful as plastics to make bottles, bottle caps, cosmetic packaging, eyeglass frames, cutlery, disposable cutlery, cutlery handles, shelving, shelving dividers, electronics housing, electronic equipment cases, computer monitors, printers, keyboards, pipes, automotive parts, automotive interior parts, automotive trim, signs, thermoformed letters, siding, toys, thermally conductive plastics, ophthalmic lenses, tools, tool handles, utensils. In another embodiment, the compositions of the present invention are suitable for use as films, sheeting, fibers, molded articles, medical devices, packaging, bottles, bottle caps, eyeglass frames, cutlery, disposable cutlery, cutlery handles, shelving, shelving dividers, furniture components, electronics housing, electronic equipment cases, computer monitors, printers, keyboards, pipes, toothbrush handles, automotive parts, automotive interior parts, automotive trim, signs, outdoor signs, skylights, multiwall film, thermoformed letters, siding, toys, toy parts, thermally conductive plastics, ophthalmic lenses and frames, tools, tool handles, and utensils, healthcare supplies, commercial foodservice products, boxes, film for graphic arts applications, and plastic film for plastic glass laminates.

The present cellulose ester compositions are useful in forming fibers, films, molded articles, and sheeting. The methods of forming the cellulose ester compositions into fibers, films, molded articles, and sheeting can be according to methods known in the art. Examples of potential molded articles include without limitation: medical devices, medical packaging, healthcare supplies, commercial foodservice products such as food pans, tumblers and storage boxes, bottles, food processors, blender and mixer bowls, utensils, water bottles, crisper trays, washing machine fronts, vacuum cleaner parts and toys. Other potential molded articles could include ophthalmic lenses and frames.

The invention further relates to articles of manufacture comprising the film(s) and/or sheet(s) containing cellulose ester compositions described herein. In embodiments, the films and/or sheets of the present invention can be of any thickness which would be apparent to one of ordinary skill in the art.

The invention further relates to the film(s) and/or sheet(s) described herein. The methods of forming the cellulose ester compositions into film(s) and/or sheet(s) can include known methods in the art. Examples of film(s) and/or sheet(s) of the invention including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, wet block processing, dry block processing and solution casting.

The invention further relates to the molded articles described herein. The methods of forming the cellulose ester compositions into molded articles can include known methods in the art. Examples of molded articles of the invention including but not limited to injection molded articles, extrusion molded articles, injection blow molded articles, injection stretch blow molded articles and extrusion blow molded articles. Methods of making molded articles include but are not limited to injection molding, extrusion, injection blow molding, injection stretch blow molding, and extrusion blow molding. The processes of the invention can include any blow molding processes known in the art including, but not limited to, extrusion blow molding, extrusion stretch blow molding, injection blow molding, and injection stretch blow molding.

This invention includes any injection blow molding manufacturing process known in the art. Although not limited thereto, a typical description of injection blow molding (IBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) blowing air into the preform, causing the preform to stretch and expand to fill the mold; 5) cooling the molded article; 6) ejecting the article from the mold.

This invention includes any injection stretch blow molding manufacturing process known in the art. Although not limited thereto, a typical description of injection stretch blow molding (ISBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) stretching the preform using an interior stretch rod, and blowing air into the preform causing the preform to stretch and expand to fill the mold; 5) cooling the molded article; 6) ejecting the article from the mold.

This invention includes any extrusion blow molding manufacturing process known in the art. Although not limited thereto, a typical description of extrusion blow molding manufacturing process involves: 1) melting the composition in an extruder; 2) extruding the molten composition through a die to form a tube of molten polymer (i.e. a parison); 3) clamping a mold having the desired finished shape around the parison; 4) blowing air into the parison, causing the extrudate to stretch and expand to fill the mold; 5) cooling the molded article; 6) ejecting the article of the mold; and 7) removing excess plastic (commonly referred to as flash) from the article.

In certain aspects, articles useful for acoustic applications are provided which can comprise any of the cellulose ester compositions disclosed herein. In certain embodiments, the acoustic article comprises a cellulose ester composition that comprises at least one cellulose ester and at least one PBS Polymer (or PAP). In embodiments, the cellulose ester is chosen from CAP or CAB, and the PBS Polymer (or PAP) is present in an amount from about 1 to 25 wt %, or about 2 to 20 wt %, or about 2 to 15 wt %, or about 2 to 10 wt %, based on the total composition.

In certain embodiments, the acoustic article comprises a cellulose ester composition that comprises at least one cellulose ester, at least one PBS Polymer (or PAP), and at least one impact modifier (as described herein). In embodiments, the cellulose ester is chosen from CAP or CAB; the PBS Polymer (or PAP) (e.g., PBS) is present in an amount from about 1 to 25 wt %, or about 2 to 20 wt %, or about 2 to 15 wt %, or about 2 to 10 wt %, based on the total composition; and the impact modifier is present in an amount from about 1 to 25 wt %, or about 2 to 20 wt %, or about 2 to 15 wt %, or about 2 to 10 wt %, based on the total composition. In embodiments, the impact modifier is core shell impact modifier, e.g., an acrylic core shell impact modifier, such as M-570.

In certain embodiments, the acoustic article comprises a cellulose ester composition that comprises at least one cellulose ester, at least one PBS Polymer (or PAP), and at least one monomeric plasticizer (as described herein). In embodiments, the cellulose ester is chosen from CAP or CAB; the PBS Polymer (or PAP) (e.g., PBS) is present in an amount from about 1 to 25 wt %, or about 2 to 20 wt %, or about 2 to 15 wt %, or about 2 to 10 wt %, based on the total composition; and the monomeric plasticizer is present in an amount from about 0.1 to 8 wt %, or about 1 to 6 wt %, or about 1 to 5 wt %, or about 1 to less than 5 wt %, or about 2 to 4 wt %, based on the total composition. In embodiments, the monomeric plasticizer is an adipate monomeric plasticizer, e.g., DOA.

In certain embodiments, the acoustic article comprises a cellulose ester composition that comprises at least one cellulose ester, at least one PBS Polymer (or PAP), at least one impact modifier (as described herein), and at least one monomeric plasticizer (as described herein). In embodiments, the cellulose ester is chosen from CAP or CAB; the PBS Polymer (or PAP) (e.g., PBS) is present in an amount from about 1 to 25 wt %, or about 2 to 20 wt %, or about 2 to 15 wt %, or about 2 to 10 wt %, based on the total composition; the impact modifier is present in an amount from about 1 to 25 wt %, or about 2 to 20 wt %, or about 2 to 15 wt %, or about 2 to 10 wt %, based on the total composition; and the monomeric plasticizer is present in an amount from about 0.1 to 8 wt %, or about 1 to 6 wt %, or about 1 to 5 wt %, or about 1 to less than 5 wt %, or about 2 to 4 wt %, based on the total composition. In embodiments, the impact modifier is core shell impact modifier, e.g., an acrylic core shell impact modifier, such as M-570, and the monomeric plasticizer is an adipate monomeric plasticizer, e.g., DOA.

In certain embodiments, the cellulose ester composition provides the acoustic article with improved vibrational (and/or sound) damping compared to a similar article made from other thermoformable plastics (with one or more other similar physical properties), such ABS, PC, Polyester or Nylon. In embodiments, the article has less total harmonic distortion (THD) compared to a similar article made from other such thermoformable plastics. In embodiments, the lower THD can be in the form of a lower average THD over a frequency range from 20 Hz to 20 KHz, or 20 Hz to 10 KHz, or 100 Hz to 10 KHz, or 20 Hz to 500 Hz, or 3000 Hz to 20 KHz, or 3000 Hz to 10 KHz, compared to a similar article made from other such thermoformable plastics. In embodiments, the lower THD can be in the form of a lower THD peak, when comparing the highest THD peak in a plot of THD as a function of frequency over a frequency range from 20 Hz to 20 KHz, or 20 Hz to 10 KHz, or 20 Hz to 500 Hz, or 3000 Hz to 20 KHz, or 3000 Hz to 10 KHz, for the cellulose ester composition article compared to a similar article made from other such thermoformable plastics.

In certain embodiments, the article (made from the cellulose ester compositions described herein) has a total harmonic distortion (THD) of less than 0.3% over the frequency range from 20 to 500 Hz, or less than 0.2% over a frequency from 3 to 10 KHz, or less than 0.6% over a frequency from 100 Hz to 10 KHz, or 100 Hz to 20 KHz, as measured by known methods.

In certain embodiments, a cellulose ester composition is provided having high vibrational damping properties that comprises CAP, e.g., CAP 482-20 (from Eastman Chemical Company), and a combination of an impact modifier and PBS Polymer (or PAP), where the composition contains 2 to 15 wt %, or 3 to 10 wt %, or 4 to 8 wt % of an impact modifier, as described herein, e.g., an acrylic core shell impact modifier, such as M-570, and also contains 2 to 15 wt %, or 3 to 10 wt %, or 4 to 8 wt % of a PBS Polymer (or PAP) (as described herein).

In certain embodiments, a cellulose ester composition is provided having high vibrational damping properties that comprises CAP, e.g., CAP 482-20 (from Eastman Chemical Company), and a combination of an impact modifier, PBS Polymer (or PAP), and monomeric plasticizer, where the composition contains 2 to 15 wt %, or 3 to 10 wt %, or 4 to 8 wt % of an impact modifier, as described herein, e.g., an acrylic core shell impact modifier, such as M-570; and also contains 2 to 15 wt %, or 3 to 10 wt %, or 4 to 8 wt % of a PBS Polymer (or PAP) (as described herein); and also contains 2 to 6 wt %, or 2 to 5 wt %, or 2 to less than 5 wt %, or 2 to 4 wt % of a monomeric plasticizer, as described herein, e.g., DOA monomeric plasticizer. In embodiments, the cellulose ester composition contains 4 to 8 wt % of an impact modifier, as described herein, e.g., an acrylic core shell impact modifier, such as M-570; and also contains 4 to 8 wt % of a PBS Polymer (or PAP) (as described herein); and also contains 2 to less than 5 wt %, or 2 to 4 wt % of a monomeric plasticizer, as described herein, e.g., DOA monomeric plasticizer.

In embodiments, the cellulose ester compositions having high (or improved) vibrational (or sound) damping can also have one or more of the other physical properties described herein. In embodiments, the one or more other physical properties is chosen from relatively high Tg (e.g., Tg of 110° C., or 120° C., or higher), high modulus, good impact properties, and good resistance to deformation under load (as such properties are described in more detail herein).

In embodiments, the cellulose ester composition has excellent vibration-damping property, high flexural modulus, and excellent impact resistance, and can be suitably used for manufactured articles such as audio equipment, electric appliances, construction/building materials, and industrial equipment, or parts or housing thereof, by using various mold-processing methods such as injection molding, extrusion molding or thermoforming. In addition, since the cellulose ester compositions of the present invention have relatively high flexural modulus, excellent vibration-damping property, and capability to sufficiently retain its shape, the cellulose ester composition can be used in manufactured articles where it is desirable to be light-weighted for transportation vehicles, such as automobiles, railcars, and airplanes, or parts or housings thereof.

The application of the cellulose ester compositions of the present invention to manufactured articles such as audio equipment, electric appliances, transportation vehicles, construction/building materials, and industrial equipment, or parts or housing thereof, can be appropriately set according to the methods for producing the parts, housings, apparatuses and equipment, applied parts, and intended purposes, and the compositions can be used in accordance with conventional methods in the art. In other words, the manufactured articles such as audio equipment, electric appliances, transportation vehicles, construction/building materials, and industrial equipment, or parts or housing thereof, can be obtained by molding the cellulose ester resin composition of the present invention in accordance with known methods.

In embodiments, the cellulose ester resin compositions of the present invention can be used for speakers, television, radio cassette players, headphones, audio components, microphones, etc. as materials for audio equipment housings; further electromotive tools such as electromotive drills and electromotive drivers, electric appliances with cooling fans such as computers, projectors, servers, and POS systems, washing machines, clothes dryers, air-conditioned indoor units, sewing machines, dishwashers, fan heaters, multifunctional photocopier machines, printers, scanners, hard disk drives, video cameras, etc. as materials for parts and housings of electric appliances with electromotive motors; electromotive toothbrushes, electromotive shavers, massaging machines, etc. as materials for parts and housings of vibrated source-containing electric appliances; generators, gas generators, etc. as materials for parts and housings of electric appliances with motors; refrigerators, automatic vending machines, air-conditioned external machines, dehumidifiers, and domestic generators as materials for parts and housings of electric appliances with compressors; materials for interior materials such as dashboards, instrumental panels, floor, doors, and roofs, and engine-related materials such as oil pans, front cover, and locker cover, etc. as materials for automobile parts; interior materials such as floor, walls, side plates, ceiling, doors, chairs, and tables, housings or parts of motor-related area, various protective covers, etc. as materials for railcar parts; interior materials such as floor, walls, side plates, ceiling, chairs, and tables, housings or parts in the engine-related parts etc. as materials for airplane parts; housings or wall materials for engine room, housings or wall materials for instrumental measurement room, as materials for ship parts; walls, ceiling, floor, partition boards, soundproof walls, shutters, curtain rails, pipe ducts, staircases, doors, etc. as materials for construction; shooters, elevators (lifts), escalators, conveyors, tractors, bulldozers, lawn mowers, etc. as materials for industrial equipment parts.

In embodiments, the acoustic article (e.g., article having high vibrational damping or low THD) can be chosen from integrated audio devices, including speakers in automobiles, televisions, and smartphones; standalone speakers (wired or wireless), home theater systems, including sound bars, subwoofers, and under television; smart speakers, including WiFi streaming, and virtual personal assistants; and headphones, earbuds, and other wearable speakers. In embodiments, the acoustic article can also be a component or part of any of these devices, such as a housing, enclosure, speaker component, microphone component, headband, wristband, clip, handle, etc.

In embodiments, the articles comprising the cellulose ester compositions can be wearable articles or body contact articles that produce sound or are subject to vibration, and can be chosen from eyeglass frames, eyeglass lenses, sunglass frames, sunglass lenses, goggles, wearable electronics, headphones, ear buds, watches, personal devices, personal electronics devices, medical devices, medical packaging, healthcare supplies, personal protection devices, safety devices, water sport articles, or components thereof. In an embodiment, the article comprising the cellulose ester composition is an ophthalmic article, e.g., eyewear or eye protection. In embodiments, the ophthalmic article can be chosen from eyeglass frames, eyeglass lenses, sunglass frames, sunglass lenses, safety glasses and/or lenses, goggles, or face shields.

In embodiments, articles comprising the cellulose ester compositions can be household articles or general consumer articles that produce sound or are subject to vibration, and can be chosen from kitchenware, barware, outdoor furniture, indoor furniture, furniture components, shelves, shelving dividers, slat walls, toys, sporting goods, luggage, appliances, small appliances, storage containers, office supply items, bathroom devices or fixtures, tools, home electronics, commercial foodservice products such as food pans, tumblers and storage boxes, bottles, food processors, blender and mixer bowls, utensils, water bottles, crisper trays, washing machine fronts, vacuum cleaner parts or components thereof.

In embodiments, certain cellulose ester compositions are particularly useful for injection molded articles that are susceptible to gate or weld line induced impact (or stress) failure, e.g., injection molded articles having relatively thin sections/regions near the gate or weld line location of the mold, where an increased stress concentration occurs at (or near) the gate or weld line location of the molded article. In certain embodiments, cellulose ester compositions comprising a PBS Polymer (or PAP), impact modifier and monomeric plasticizer (as described herein) can provide improved gate and/or weld strength compared to similar compositions, but without all three additives.

This invention can be further illustrated by the following examples of preferred embodiments thereof, although it will be understood that these examples are included merely for purposes of illustration and are not intended to limit the scope of the invention unless otherwise specifically indicated.

EXAMPLES

Cellulose ester compositions were prepared by compounding selected cellulose esters with PBS polymers, impact modifiers and/or monomeric plasticizers. Unless otherwise specified, the compounding of the cellulose ester compositions was conducted on a Leistritz 18 mm (50:1 L/D ratio) twin screw extruder at a throughput of 18 lbs/hour with screw speed of 250 rpm and barrel temperature of 220° C. The barrel temperatures were 230° C. for compounding CA and CAP141-20 based compositions. The cellulose ester grades used in the following examples are identified above in Table 1.

The PBS polymers used in the examples are identified below in Table 2.

TABLE 2

| PBS polymers | | | | |
|---|---|---|---|---|
| PBS Grade | Commercial PBS Material | MFR 190° C., 2.16 kg | PSeq Mn Daltons | Elongation at Break (%) |
| A | FD91 | 5 | 18744 | 210 |
| B | FZ71 | 22 | 17203 | 170 |
| C | FD92PM | 4 | 17948 | 380 |
| D | TH803S | 20 | 15744 | 300 |

FD91, FZ71, and FD92PM were obtained from PTT MCC Biochem. TH803S was obtained from Blue Ridge tunhe.

The examples include testing on injection molded plaques and bars. Unless otherwise specified, the moldings were done on a Toyo injection molding machine with barrel temperature of 240° C. (460° F.) and mold temperature of 70° C. (160° F.). Unless otherwise specified, Tg, Haze, Light Transmission, Clarity, Melt Viscosity, Notched Izod Impact Strength, and Gate Toughness were measured/determined as discussed below.

Glass transition temperature (Tg) was measured according to ASTM Standard Method D3418, where the sample is heated from −100° C. at a heating rate of 20° C./min. DSC scans of blends of materials may show multiple Tg transitions. If more than one Tg transition was determined during the scan, the matrix glass transition is defined as the highest Tg measured during the scan.

Percent Haze and Light Transmission were measured on 102 mm×102 mm×3.2 mm injection molded plaques according to ASTM D1003. In the examples, where a clarity grading was provided, the grading was determined by visual inspection, where a grading of clear corresponds to a % haze of less than about 10%, a grading of slight haze corresponds to a % haze greater than about 10%, or greater than about 15%, and less than about 25%, and a grading of haze or hazy corresponds to a % haze greater than about 25%.

Notched Izod Impact Strength was performed on 3.2 mm thick molded bars at 23° C. after notching according to ASTM Method D256, after conditioning the bars at 23° C. and 50% RH for 48 hours.

Gate and Weld-Line Toughness was performed by first injection molding square frames in a square picture frame mold having a cavity with each side of the square frame having a width of 0.5 inches (12.7 mm), thickness of 0.125 inches (3.2 mm), and length of 5 inches (12.7 cm). Unless otherwise specified, the moldings were done on a Toyo injection molding machine with barrel temperature of 240° C. (460° F.), mold temperature of 700 (160° F.), injection speed of 1.0 in/s (2.54 cm/s), and a pressure (injection/holding) of 1600/1500 psi (10342/11032 kPa). The mold included an approximately 1 mm diameter pin gate located in the center of the face (i.e., center of width and length dimensions) on one side of the frame and configured to introduce the molten injection moldable material into the cavity, such that the material would flow through the frame cavity and meet approximately at the center line of the opposite side (from the gate) and create a weld line (where the material meets). The configuration of the mold, with the pin gate and weld line, is depicted in FIG. 1 (thickness dimension not shown).

Two test bars were cut from each molded picture frame to provide bars having a width of 0.5 inches (12.7 mm), thickness of 0.125 inches (3.2 mm), and length of 5 inches (12.7 cm). Each material formulation tested was molded into enough frames to produce at least three of each type of test bar (including gate, weld line and control bars). The three different test bars were a gate test bar, a weld line test bar, and a control test bar (side that does not have the pin gate or weld line), as indicated in FIG. 1.

Gate and Weld-Line Toughness was determined by measuring impact strength on each type of the 3.2 mm thick bars at 23° C. according to ASTM Method D 3763, after conditioning the bars at 23° C. and 50% RH for 48 hours. The gate bar was impacted in the center on the opposite face of the gate and the weld line and control bars were impacted on the corresponding face (i.e., opposite the gate side of the frame). The test was repeated three times for each bar and an average (of the three tests) impact value was recorded.

Example 1—CAP with and without Monomeric Plasticizer

CAP grades from Table 1 without any monomeric plasticizer (Ex. 1-1) and with 10% DOA monomeric plasticizer (Ex. 1-2) were each injection molded into 3.2 mm thick by 12.8 mm wide bars on a Toyo 110 Ton injection molding machine with barrel temperature of 240° C. and mold temperature of 70° C.

The clarity, melt viscosity, Tg and Izod Impact strength were determined for each sample. The compositions and properties of the materials for Examples 1-1 and 1-2 are listed below in table 3.

TABLE 3

Clear, CAP materials with and without monomeric plasticizer.

| Ex. 1 | CE grades | Monomeric plasticizer Grades | Monomeric plasticizer % | clarity | Tg (° C.) | Flexural modulus | Notched Izod Impact Strength @23 C., J/m |
|---|---|---|---|---|---|---|---|
| 1 | 482-20 |  | 0 | Clear | 147 | 2100 | 70.9 |
| 2 | 482-20 | DOA | 10 | Clear | 108 | 1200 | 312 |
| 3 | 141-20 |  | 0 | clear | 174 | 3100 | 45.5 |

Table 3 shows properties of CAP 482-20 blended without (Ex 1-1) and with monomeric plasticizer (Ex 1-2), and CAP 141-20 without monomeric plasticizer (Ex. 1-3). A review of the table reveals that the plastics remained clear. The CAP plastics without monomeric plasticizer had relatively high glass transition temperature but a lower level of impact resistance. On the contrary, the plasticized CAP compound had a higher level of impact strength, but lower Tg. It would be desired to have a cellulose ester composition that has both the advantage of high Tg and good impact resistance.

Example 2—CE and PBS Blends

Different cellulose ester grades (from Table 1) were blended with different grades and different amounts of PBS polymers and were injection molded into 3.2 mm thick by 12.8 mm wide bars on a Toyo 110 Ton injection molding machine with barrel temperature of 240° C. and mold temperature of 70° C.

The clarity, flexural modulus, Tg and notched Izod Impact strength were determined for each sample. The compositions and properties of the materials for Example 2 are listed below in table 4.

TABLE 4

CE and PBS polymer blends

| Ex. 2 | CE grades | PBS grade | % PBS | clarity | Tg | Flexural modulus | Notched Izod Impact Strength @23 C., J/m |
|---|---|---|---|---|---|---|---|
| 1 | 482-20 | FD92 | 10 | Clear | 120 | 2102 | 140 |
| 2 | 482-20 | 803S | 10 | Clear | 120 | 2032 | 97 |

TABLE 4-continued

CE and PBS polymer blends

| Ex. 2 | CE grades | PBS grade | % PBS | clarity | Tg | Flexural modulus | Notched Izod Impact Strength @23 C., J/m |
|---|---|---|---|---|---|---|---|
| 3  | 482-20 | 803S | 20 | Clear | 83  | X    | 215.8 |
| 4  | 141-20 | FD91 | 5  | Clear | 172 | 2983 | 116 |
| 5  | 141-20 | FD91 | 10 | Clear | 168 | 3026 | 98  |
| 6  | 141-20 | FD91 | 15 | Clear | 162 | 2660 | 112 |
| 7  | 141-20 | FZ71 | 5  | Clear | 161 | 2802 | 112 |
| 8  | 141-20 | FZ71 | 10 | Clear | 166 | 3191 | 110 |
| 9  | 141-20 | FZ71 | 15 | Clear | 161 | 2445 | 114 |
| 10 | 141-20 | 803S | 10 | Clear | 172 | 2835 | 116 |
| 11 | 141-3  | FD92 | 10 | Clear | 172 | 2632 | 196 |
| 12 | 141-8  | FD92 | 10 | Clear | 172 | 2781 | 211 |
| 13 | 141-20 | FD92 | 10 | Clear | 172 | 2983 | 212 |
| 14 | 141-20 | 803S | 25 | clear | 149 | X    | X   |
| 15 | VM230  | FD92 | 10 | Clear | 182 | 2483 | 126 |
| 16 | CAP202 | 803S | 25 | Clear | 163 | 1793 | 251 |

A review of table 4 reveals that the CE/PBS compounds had higher Tg in comparison with example 1-2 from Table 3. It further shows that for CAP 141-20 when PBS was added, it resulted in formulations that had both high Tg and increased toughness (i.e., Impact Strength greater than 96 J/m), and that the FD92 grade PBS resulted in the highest impact strength.

Example 3: CE, PBS Polymer and Impact Modifier Blends

CAP 482-20 cellulose ester grade was blended with different grades of PBS polymers and impact modifiers, and were injection molded into 3.2 mm thick by 12.8 mm wide bars on a Toyo 110 Ton injection molding machine with barrel temperature of 240° C. and mold temperature of 70° C.

The clarity, flexural modulus, and Izod Impact strength were determined for each sample. The compositions and properties of the materials for Example 3 are listed below in table 5.

TABLE 5

Blends of CE, PBS and impact modifiers.

| Ex. 3 | PBS Grades | PBS Wt % | Impact modifier | IM Wt % | clarity | Instrument Impact failure | Flexural modulus (MPa) | Notched Izod Impact strength @23 C., J/m |
|---|---|---|---|---|---|---|---|---|
| 1 | 803S | 10% | M570 | 6%  | clear  | Tough | 1828 | 251 |
| 2 | FD92 | 10% | M570 | 6%  | clear  | Tough | 1738 | 211 |
| 3 | FD92 | 10% | Blendex 338 | 10% | opaque | Tough | 1666 | 204 |
| 4 | FD92 | 10% | MBS  | 6%  | clear  | Tough | 1762 | 232 |

Kane Ace M570 acrylic and B564 MBS core shell impact modifiers were obtained from Kaneka. Blendex 338 ABS core shell impact modifier was obtained from Galata Chemicals.

A review of table 5 reveals that blending an acrylic core shell impact modifier and PBS with a CAP resulted in a higher toughness compared to similar amounts of just acrylic core shell impact modifier or just the PBS (example 2-2), as well as having good clarity. Selected materials were also injection molded into plaques 3.2 mm thick by 102 mm by 102 mm wide on a Toyo 110 Ton injection molding machine with barrel temperature of 240° C. and mold temperature of 70° C. for instrumented impact testing per ASTM D 3763. Ductile failure mode is given where the specimen deformed plastically before fracturing without cracks radiating more than 10 mm beyond the center of the impact point. Brittle failure mode is given where the specimen test area is broken into two or more pieces, with sharp edges and shows almost no plastic flow. In table 5, an impact failure of tough refers to ductile failure.

Example 4—Gate Toughness Test

CAP grade 1 from Table 1 was blended with various amounts of M570 acrylic impact modifier, PBS and DOA monomeric plasticizer. Unless specified otherwise, the PBS was PBS grade D (TH803S). Each blend was injection molded into square picture frames (sides having a length of 5 inch, as discussed above) on a Toyo 110 Ton injection molding machine with (unless specified otherwise) barrel temperature of 240° C. (460° F.), mold temperature of 70° C. (160° F.), injection speed of 1.0 in/s (2.54 cm/s), and a pressure (injection/holding) of 1600/1500 psi (10342/11032 kPa). Test bars having a width of 0.5 inches (12.7 mm), thickness of 0.125 inches (3.2 mm), and length of 5 inches (12.7 cm) were cut from the molded frames for instrumented impact testing per ASTM D 3763. The blend compositions and impact strength results are shown below in table 6.

TABLE 6

Gate Toughness of Blends

| Ex. 4 | % IM | % PBS | % DOA | % Total Additive | Impact Strength @23 C., J/m Control | Weld Line | Gate |
|---|---|---|---|---|---|---|---|
| 1 | 0 | 0 | 10 | 10 | 314 | 44 | 37 |
| 2 | 6 | 0 | 0 | 6 | 325 | 86 | 60 |
| 3 | 6 | 0 | 0 | 6 | 345 | 31 | 87 |
| 4 | 6 | 0 | 5 | 11 | 343 | 146 | 99 |
| 5 | 6 | 0 | 5 | 11 | 341 | 272 | 96 |
| 6 | 0 | 10 | 0 | 10 | 395 | 38 | 31 |
| 7 | 0 | 7 | 0 | 7 | 341 | 127 | 69 |
| 8 | 6 | 5 | 0 | 11 | 361 | 65 | 61 |
| 9 | 6 | 5 | 0 | 11 | 388 | 237 | 61 |
| 10 | 6 | 10 | 0 | 16 | 365 | 299 | 76 |
| 11 | 6 | 10 | 0 | 16 | 365 | 272 | 94 |
| 12 | 6 | 4 | 0 | 10 | 377 | 41 | 91 |
| 13 | 6 | 6 | 0 | 12 | 383 | 50 | 85 |
| 14 | 8 | 8 | 0 | 16 | 386 | 61 | 79 |
| 15 | 6 | 10 | 5 | 21 | 319 | 243 | 224 |
| 16 | 6 | 10 | 5 | 21 | 331 | 255 | 228 |
| 17 | 6 | 10 | 5 | 21 | 330 | 291 | 276 |
| 18 | 6 | 10 | 5 | 21 | 330 | 284 | 275 |
| 19 | 6 | 10 | 5 | 21 | 344 | 276 | 269 |
| 20 | 3 | 5 | 5 | 13 | 323 | 205 | 122 |
| 21 | 3 | 5 | 5 | 13 | 349 | 219 | 104 |
| 22 | 3 | 10 | 5 | 18 | 357 | 234 | 133 |
| 23 | 6 | 6 | 4 | 16 | 350 | 161 | 130 |
| 24 | 6 | 6 | 4 | 16 | 370 | 299 | 154 |
| 25 | 6 | 6 | 4 | 16 | 344 | 274 | 146 |
| 26 | 6 | 6 | 3 | 15 | — | — | 225 |
| 27 | 6 | 6 | 2 | 14 | — | — | 147 |
| 28 | 6 | 4 | 3 | 13 | — | — | 169 |
| 29 | 6 | 4 | 2 | 12 | — | — | 103 |

Examples 4-6, 4-7 and 4-12 to 4-14 were made with PBS grade C (FD92PM). Examples 4-23 to 4-29 were molded with a barrel temperature of 241° C. (465° F.) and a mold temperature of 79° C. (175° F.), and Example 4-24 was molded at a pressure (injection/hold) of 1900/1800 psi (13100/12411 kPa). Examples 4-7, 4-17, 4-20 to 4-22 were molded with a mold temperature of 24° C. (75° F.), Example 4-18 was molded with a mold temperature of 43° C. (110° F.), and Example 4-19 was molded with a mold temperature of 63° C. (145° F.).

A review of table 6 reveals that the blends that included the impact modifier, PBS and monomeric plasticizer had higher Gate and Weld line impact values, compared to blends with only one or two additives.

The above detailed description of embodiments of the disclosure is intended to describe various aspects of the invention in sufficient detail to enable those skilled in the art to practice the invention. Other embodiments can be utilized and changes can be made without departing from the scope of the invention. The above detailed description is, therefore, not to be taken in a limiting sense. The scope of the present invention is defined only by claims presented in subsequent regular utility applications, along with the full scope of equivalents to which such claims are entitled.

In this description, references to "one embodiment," "an embodiment," or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, step, etc. described in one embodiment may also be included in other embodiments, but is not necessarily included. Thus, the present technology can include a variety of combinations and/or integrations of the embodiments described herein.

That which is claimed is:

1. A cellulose ester composition comprising at least one cellulose ester, at least one polymeric aliphatic polyester (PAP), at least one impact modifier and at least one monomeric plasticizer, wherein said at least one cellulose ester is chosen from cellulose propionate (CP), cellulose butyrate (CB), cellulose acetate propionate (CAP), cellulose acetate butyrate (CAB), cellulose propionate butyrate (CPB), cellulose tripropionate (CTP), or cellulose tributyrate (CTB);
   wherein the PAP is a polymeric aliphatic polyester that comprises either residues of a $C_2$ to $C_4$ alkane diol and residues of $C_4$ to $C_8$ alkyl dicarboxylic acid, or residues of a ring-opened lactone;
   wherein the monomeric plasticizer is present in an amount from 1 to 5 wt %, based on the total weight of the cellulose ester composition;
   wherein said cellulose ester composition has a Tg of at least 110° C. and a notched Izod impact strength of at least 80 J/m, measured according to ASTM Method D256 at 23° C. using a 3.2 mm bar, after conditioning the bar at 23° C. and 50% RH for 48 hours.

2. The cellulose ester composition according to claim 1, wherein said cellulose ester composition further has both a weld-line toughness and gate toughness of at least 100 J/m.

3. The cellulose ester composition according to claim 1, wherein said at least one PAP is chosen from poly(ethylene succinate) (PES), poly (butylene succinate) (PBS), poly (ethylene adipate) (PEA), poly(butylene adipate) (PBA), or mixtures thereof.

4. The cellulose ester composition according to claim 1, wherein said at least one PAP is poly(butylene succinate) (PBS) or a copolymer of poly(butylene succinate) and poly(butylene adipate) (PBSA).

5. The cellulose ester composition according to claim 1, wherein said composition comprises 65-95 wt % of said cellulose ester, 2-15 wt % of said PAP, 2-10 wt % of said impact modifier, and 1 to less than 5 wt % of said monomeric plasticizer, wherein said impact modifier is an acrylic core shell impact modifier.

6. The cellulose ester composition according to claim 1, wherein said composition comprises 65-95 wt % of said cellulose ester, 2-10 wt % of said PAP, 2 to 10 wt % of said impact modifier, and 1 to less than 5 wt % of said monomeric plasticizer.

7. The cellulose ester composition according to claim 1, wherein said composition comprises 65-95 wt % of said cellulose ester, 2-10 wt % of said PAP, 4 to 8 wt % of said impact modifier, and 2 to 4 wt % of said monomeric plasticizer.

8. The cellulose ester composition according to claim 1, wherein said cellulose ester is chosen from cellulose acetate propionate (CAP) or cellulose acetate butyrate (CAB).

9. The cellulose ester composition according to claim 1, wherein said PAP is PBS or PBSA having an MFR (190° C., 2.16 kg) less than 25.

10. The cellulose ester composition according to claim 1, wherein said PAP is PBS or PBSA having an Elongation at Break of 250% or greater.

11. The cellulose ester composition according to claim 1, wherein said PAP is PBS or PBSA having a polystyrene (PS) equivalent number average molecular weight (Mn) greater than 15,000.

12. The cellulose ester composition according to claim 1, wherein said cellulose ester is a cellulose acetate propionate (CAP) containing from about 10 to about 40% by weight propionyl.

13. The cellulose ester composition according to claim 1, wherein the cellulose ester composition has a notched Izod impact strength of at least 200 J/m, measured according to ASTM Method D256 at 23° C. using a 3.2 mm bar, after conditioning the bar at 23° C. and 50% RH for 48 hours.

14. The cellulose ester composition according to claim 1, wherein said composition further comprises at least one additive selected from the group consisting of antioxidants, thermal stabilizers, mold release agents, antistatic agents, whitening agents, colorants, minerals, UV stabilizers, lubricants, nucleating agents, reinforcing fillers, glass fiber, carbon fiber, flame retardants, dyes, pigments, colorants, additional resins and combinations thereof.

15. The cellulose ester composition according to claim 1, wherein said composition further comprises at least one polymeric component as a blend wherein said polymer is selected from the group consisting of nylons; polyesters; polyamides; polystyrenes; other cellulose esters, cellulose ethers; polystyrene copolymers; styrene acrylonitrile copolymers; polyolefins; polyurethanes; acrylonitrile butadiene styrene copolymers; poly(methylmethacrylate); acrylic copolymers; poly(ether-imides); polyphenylene oxides; polyvinylchlorides; polyphenylene sulfides; polyphenylene sulfide/sulfones; poly(ester-carbonates); polycarbonates; polysulfones; poly lactic acid; poly butylenesuccinate; polysulfone ethers; and poly(ether-ketones) of aromatic dihydroxy compounds; and combinations thereof.

16. An article of manufacture comprising the cellulose ester composition according to claim 1.

17. The article of manufacture according to claim 16, wherein the article is chosen from an injection molded article, extrusion molded article, injection blow molded article, injection stretch blow molded article, extrusion blow molded article, or a compression molded article.

18. The article of manufacture according to claim 16, wherein the article is an ophthalmic article.

19. The article of manufacture according to claim 18, wherein the ophthalmic article is an eyeglass or sunglass frame.

20. A film or sheet comprising a cellulose ester composition according to claim 1.

* * * * *